(12) United States Patent
Bashkin

(10) Patent No.: US 10,878,373 B2
(45) Date of Patent: Dec. 29, 2020

(54) FLAME RETARDANT STORAGE CABINET WITH INVENTORY CONTROL

(71) Applicant: 3 STRIKE, LLC, Cleveland, OH (US)

(72) Inventor: Leonard M. Bashkin, Cleveland, OH (US)

(73) Assignee: 3 STRIKE, LLC, Cleveland, OH (US)

( * ) Notice: Subject to any disclaimer, the term of this patent is extended or adjusted under 35 U.S.C. 154(b) by 183 days.

(21) Appl. No.: 16/166,595

(22) Filed: Oct. 22, 2018

(65) Prior Publication Data

US 2019/0122167 A1   Apr. 25, 2019

Related U.S. Application Data

(60) Provisional application No. 62/575,101, filed on Oct. 20, 2017.

(51) Int. Cl.

| | | |
|---|---|---|
| G06Q 10/08 | (2012.01) |
| A62C 3/00 | (2006.01) |
| G06Q 50/28 | (2012.01) |
| G06K 7/10 | (2006.01) |
| B65G 1/02 | (2006.01) |
| A47F 10/02 | (2006.01) |
| G06K 9/00 | (2006.01) |
| G07C 9/00 | (2020.01) |
| H04N 5/247 | (2006.01) |

(Continued)

(52) U.S. Cl.
CPC .......... *G06Q 10/087* (2013.01); *A47F 10/02* (2013.01); *A62C 3/002* (2013.01); *B65G 1/02* (2013.01); *G06K 7/10297* (2013.01); *G06K 9/00771* (2013.01); *G06K 9/00892* (2013.01);

*G06Q 50/28* (2013.01); *G07C 9/00896* (2013.01); *G07C 9/33* (2020.01); *G07C 9/37* (2020.01); *H04N 5/247* (2013.01); *A47F 2010/005* (2013.01); *A47F 2010/025* (2013.01); *B65G 2207/22* (2013.01); *G07C 2009/0092* (2013.01)

(58) Field of Classification Search
None
See application file for complete search history.

(56) References Cited

U.S. PATENT DOCUMENTS

| | | |
|---|---|---|
| 5,905,653 A | 5/1999 | Higham et al. |
| 6,694,221 B2 | 2/2004 | Chavez et al. |

(Continued)

FOREIGN PATENT DOCUMENTS

| | | | |
|---|---|---|---|
| CN | 206369975 | * 8/2017 | ............. G05D 27/02 |
| EP | 1068598 | 1/2001 | |

(Continued)

OTHER PUBLICATIONS

NPL_CN206369975, Original Chinese Patent (Year: 2017).*

*Primary Examiner* — Paul Danneman
(74) *Attorney, Agent, or Firm* — Tucker Ellis LLP

(57) ABSTRACT

Systems and methods of the invention relate to managing an inventory of items within a storage container. A storage container can house one or more items for distribution among one or more users such as, for instance, employees. The storage container discussed herein provides authentication of a user, tracking of the inventory each user removes or returns, video/image capture of user during access of the storage container, wireless tracking of items housed within the storage container, among others.

18 Claims, 18 Drawing Sheets

(51) Int. Cl.
*G07C 9/33* (2020.01)
*G07C 9/37* (2020.01)
*A47F 10/00* (2006.01)

(56) References Cited

U.S. PATENT DOCUMENTS

| | | | |
|---|---|---|---|
| 7,092,789 | B2 | 8/2006 | Chavez et al. |
| 8,570,169 | B2 | 10/2013 | Green et al. |
| 8,686,831 | B2 | 4/2014 | Green et al. |
| 9,089,972 | B2 * | 7/2015 | Stuart ............... H04L 67/10 |
| 9,123,224 | B2 | 9/2015 | Hall et al. |
| 2002/0118111 | A1 | 8/2002 | Brown |
| 2004/0108323 | A1 * | 6/2004 | Shows ............... G07F 5/26 221/9 |
| 2007/0215238 | A1 | 9/2007 | Ruikka |
| 2008/0044001 | A1 | 2/2008 | Kim |
| 2009/0072029 | A1 | 3/2009 | Martin |
| 2009/0121017 | A1 | 5/2009 | Cato |
| 2010/0045423 | A1 | 2/2010 | Glickman |
| 2010/0106625 | A1 | 4/2010 | Mccoy |
| 2011/0178630 | A1 | 7/2011 | Green |
| 2012/0130534 | A1 | 5/2012 | Wurm |
| 2012/0200385 | A1 | 8/2012 | Savage |
| 2013/0070090 | A1 | 3/2013 | Bufalini |
| 2013/0282392 | A1 | 10/2013 | Wurm |
| 2013/0332323 | A1 | 12/2013 | Phillips |
| 2014/0138440 | A1 | 5/2014 | D'Ambrosio |
| 2014/0168396 | A1 | 6/2014 | Kempiak |

FOREIGN PATENT DOCUMENTS

| | | |
|---|---|---|
| EP | 2363831 | 7/2011 |
| JP | 2002295959 | 10/2002 |
| JP | 2003004366 | 1/2003 |
| JP | 2007046833 | 2/2007 |
| WO | 2005084237 | 9/2005 |

* cited by examiner

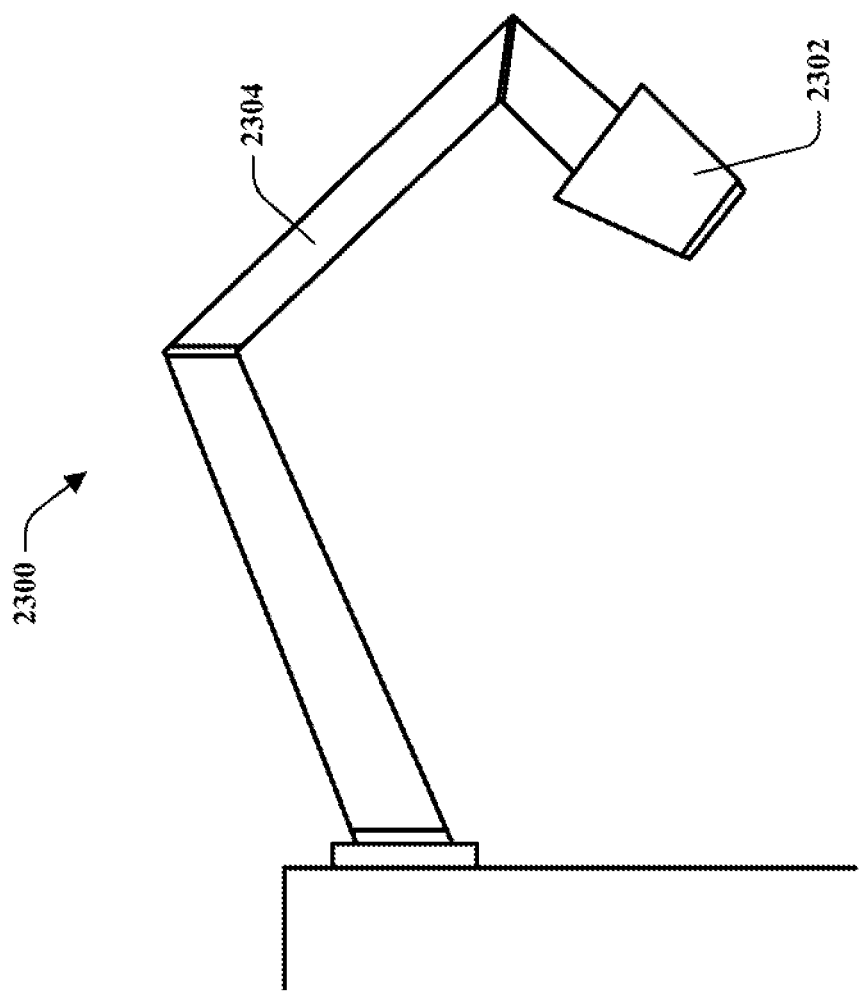

FLAME RETARDANT STORAGE CABINET WITH INVENTORY CONTROL

CROSS-REFERENCE TO RELATED APPLICATIONS

This application is a non-provisional of and claims the benefit of U.S. Provisional Application Ser. No. 62/575,101, filed Oct. 20, 2017, and entitled "FLAME RETARDANT STORAGE CABINET WITH INVENTORY CONTROL." The entirety of this application is incorporated herein by reference.

BACKGROUND

Technical Field

Embodiments of the subject matter disclosed herein relate generally to systems and methods for inventory management in an environment, and more specifically, relate to a flame retardant or fire-proof powered storage container for managing inventory items and providing for the inventory's ease of replenishment.

Discussion of Art

A variety of professional and other environments rely on a diverse assortment of inventory. From pens and pencils, which may be stocked in the hundreds, to expensive or specialized electronic equipment shared between a group of workers, it is important for organizations or even individuals to track and evaluate supplies or equipment. Traditionally, supplies are kept in open areas, where anyone may remove or utilize them, or secured areas, which require a specific person to control access. In open areas, easy access to supplies may encourage their misuse or loss, increasing costs and the burden of managing supplies. In secure areas, key personnel who frequently access inventory may be inconvenienced, inventory may not be immediately available as-needed, and additional personnel is required to control access. An alternative arrangement can be for individuals to seek their own supply, which is less efficient than ordering in bulk for a group, and either encumbers individuals with the expense of furnishing their respective inventory items at retail cost or creates additional paperwork and effort for reimbursement.

Existing technologies attempting to automate such management are complex and expensive. They typically rely on expensive or custom hardware and software, are error-prone, and are frequently limited to specific areas and difficult to move. Further, existing systems do not positively identify each user, which limits the resolution of inventory management data and increases the likelihood of misuse or abuse by individuals. In addition, existing systems are complex and cumbersome, and as a result access to inventory is tedious, frustrating, and wasteful.

Accordingly, it may be desirable to have systems or methods for managing an inventory that differs from those systems and methods that are currently available, for example, to reduce cost, improve ease of use, affirmatively identify users interacting with inventory, increase system flexibility after deployment, and decrease the time required to access, remove, or replenish inventory properly. Such examples are non-exhaustive and non-limiting, and the systems and methods described herein will include other benefits and possess other motivations than those expressly listed.

BRIEF DESCRIPTION

In an embodiment, a system is provided that includes a storage container that houses a first item and a second item, wherein the first item includes a first amount and a second item includes a second amount and the first item and the second item are non-medical related. In the embodiment, the inventory system can further include a verification component that is configured to receive a portion of data from a user and a lock mechanism for the storage container that secures an access thereto based upon the portion of data from the user. The inventory system further includes a camera system that provides a first camera focused on the user and a second camera focused on at least one of the first item or the second item. In an embodiment, the system can include at least four (4) cameras in which one camera is positioned and focused on the user accessing the storage container and the three (3) cameras are focused on sections of the storage container that includes items (e.g., on each shelf, among others), and all user motions around those items.

In the embodiment, the inventory system can include a controller component that is configured to record media from the first camera and the second camera upon verification of the portion of data from the user and a wireless scanning device that provides a scan of a portion of the first item or a portion of the second item to indicate a removal from the storage container. The controller component monitors at least one of the first amount of the first item or the second amount of the second item based on at least one of the scans or recorded media and the controller component stores at least one of the portion of data, the scan, or the recorded media.

BRIEF DESCRIPTION OF THE DRAWINGS

Reference is made to the accompanying drawings in which particular embodiments and further benefits of the invention are illustrated as described in more detail in the description below, in which:

FIG. 23 is a side view of a camera arm.

DETAILED DESCRIPTION

Figure 1:
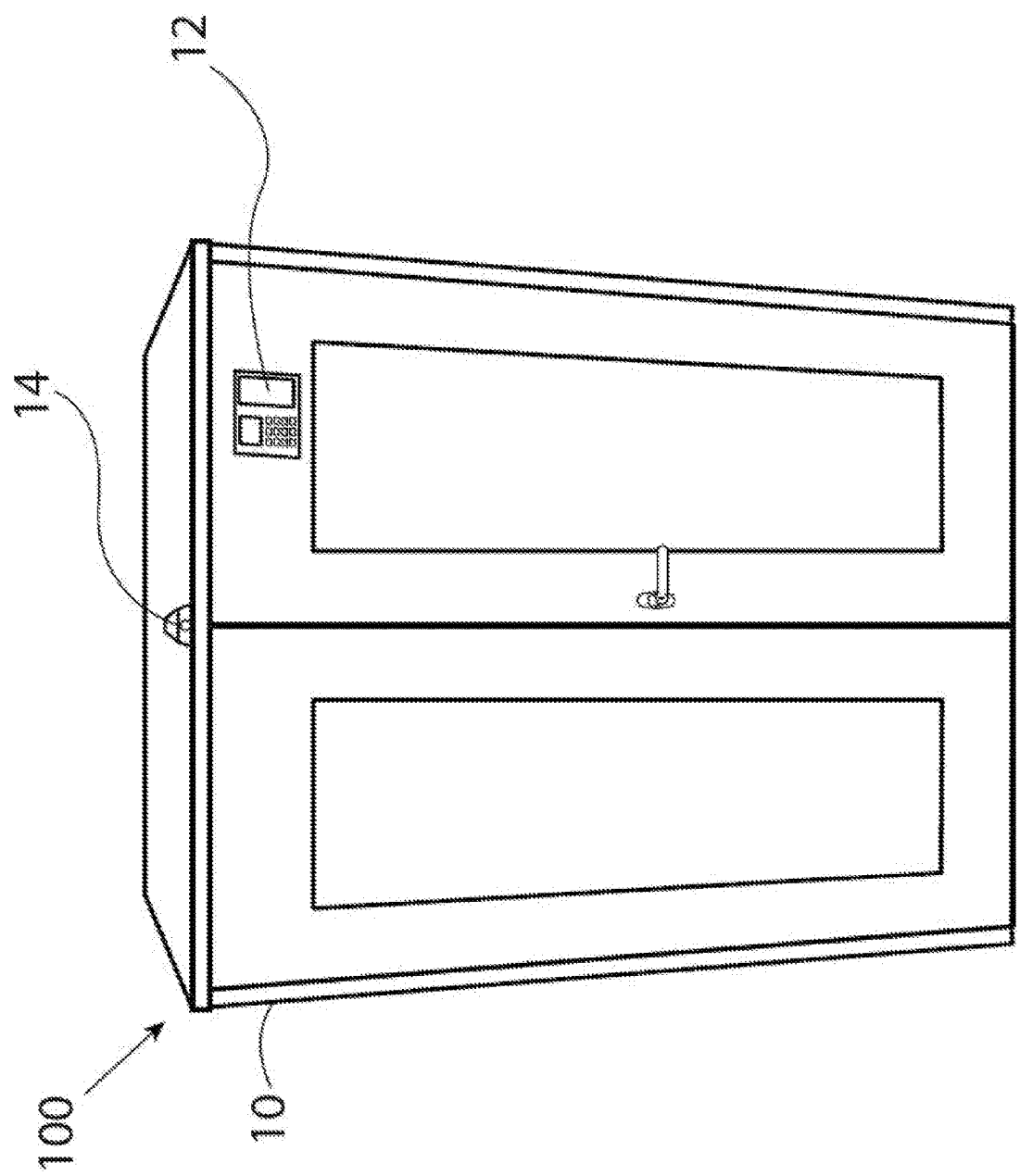
FIG. 1 is an illustration of an embodiment of a system for managing an inventory of items for an environment.

Embodiments of the invention relate to methods and systems for managing an inventory of items within a storage container, wherein the inventory of items are non-medical related. A storage container can house one or more items for distribution among one or more users (e.g., employees, members, students, volunteers, contractors, and others). The storage container discussed herein provides authentication of a user, tracking of inventory that each user removes or returns, video/image capture of user during access of the storage container, wireless tracking of items housed within the storage container, among others. The storage container can provide management of items within an environment by tracking each user and items consumed, used, removed, and/or returned. In addition, the storage container and/or interfaces associated therewith can enable users (e.g., administrators) to add or remove items of the environment from the container to effect detailed, accurate tracking of particular items and dynamically manage inventory control efforts.

With reference to the drawings, like reference numerals designate identical or corresponding parts throughout the several views. However, the inclusion of like elements in different views does not mean a given embodiment necessarily includes such elements or that all embodiments of the invention include such elements.

The term "component" as used herein can be defined as a portion of hardware, a portion of software, or a combination thereof. A portion of hardware can include at least a processor and a portion of memory, wherein the memory includes an instruction to execute. The term "component" can further include a controller programmed to perform a function, step, or methodology as described herein.

The term "storage container" or "container" as used herein can be defined as a mechanical device that defines a volume, at least partially surrounded by the device, wherein the volume can house one or more items. In particular, the storage container or container can include an opening that allows a user to retrieve one or more items housed therein. Moreover, the storage container can house the items and such storage container may be secured/unsecured, open/closed, locked/unlocked, et cetera, thereafter.

As used herein, an "inventory" can be one or more items capable of being at least partially controlled by systems or methods disclosed herein. While the concept of "inventory" lends itself to boxes of pens or sheets of paper, it will be understood on review of the disclosures herein that an inventory can be a single item (e.g., a computer, a piece of scientific equipment, a camera, sensitive print information, a piece of manufacturing equipment), a plurality of items (e.g., paperclips, batteries, manufacturing components, repair parts), and/or combinations thereof. In embodiments, only a portion or related aspect of an inventory is stored in a container described herein. For example, one set of items controlled by a container herein can be keys for one or more vehicles. Thus, a vehicle inventory can be managed by aspects herein, although the vehicles themselves are not stored in the container. In another embodiment, a large piece of equipment can be partially secured using devices in here, and cannot be used or moved without unlocking, despite the fact that physical contact with at least a portion of the equipment is possible before it is released by the container. These aspects are provided for illustrative purposes only, and are not intended to prohibit the use of larger containers (e.g., sufficient to contain an automobile) with aspects herein. For example, a shipping container or secure room can be configured with aspects herein to maintain larger items in its volume. While "inventory" can be used to indicate a collective plural, it may also be used herein to indicate a particular item or items. "Inventory item" or similar terminology can refer to one or more of a specific item within an inventory. Unless specifically indicated otherwise, such language may be used interchangeably in instances.

Further, while aspects herein are generally directed toward a workplace environment and an inventory of supplies or equipment associated with an office, no example given or inference drawn should be deemed to limit application of the techniques herein to a particular environment. The container may be used in a variety of indoor or outdoor settings, and, in embodiments, may be ruggedized or include hermetic seals to withstand environmental conditions or hazards associated with use in a particular environment.

Systems and methods herein can be designed to track internal inventory for customers who currently use earlier vending machines at less than half the cost of existing systems. Low-cost components can be integrated and flexible systems provided to avoid the expense of custom solutions.

Systems and methods herein can further include biometric or other positive user authentication. Video recording adds an additional level of accurate monitoring. By carefully identifying each and every user interacting with an inventory control system, users are motivated to use the system properly and properly manage organizational resources.

Hardware and software used with aspects disclosed herein can additionally be integrated end-to-end through an organization. Network, hardware, and software compatibility between components permits devices to "talk to" one another, as well as communicate with other devices.

Despite the capability of systems and methods herein to interact remotely, aspects herein are configured to function without Internet access. By avoiding a connectivity requirement to use, aspects herein are made more robust and flexible than a system that only functions with Internet access.

Systems and methods herein also dramatically increase the speed and efficiency of inventory access and management from the user perspective. Authentication, opening, removal, and closing of inventory management systems herein can take less than 15 seconds, whereas existing solutions often require dramatically more time to utilize.

Figure 2:
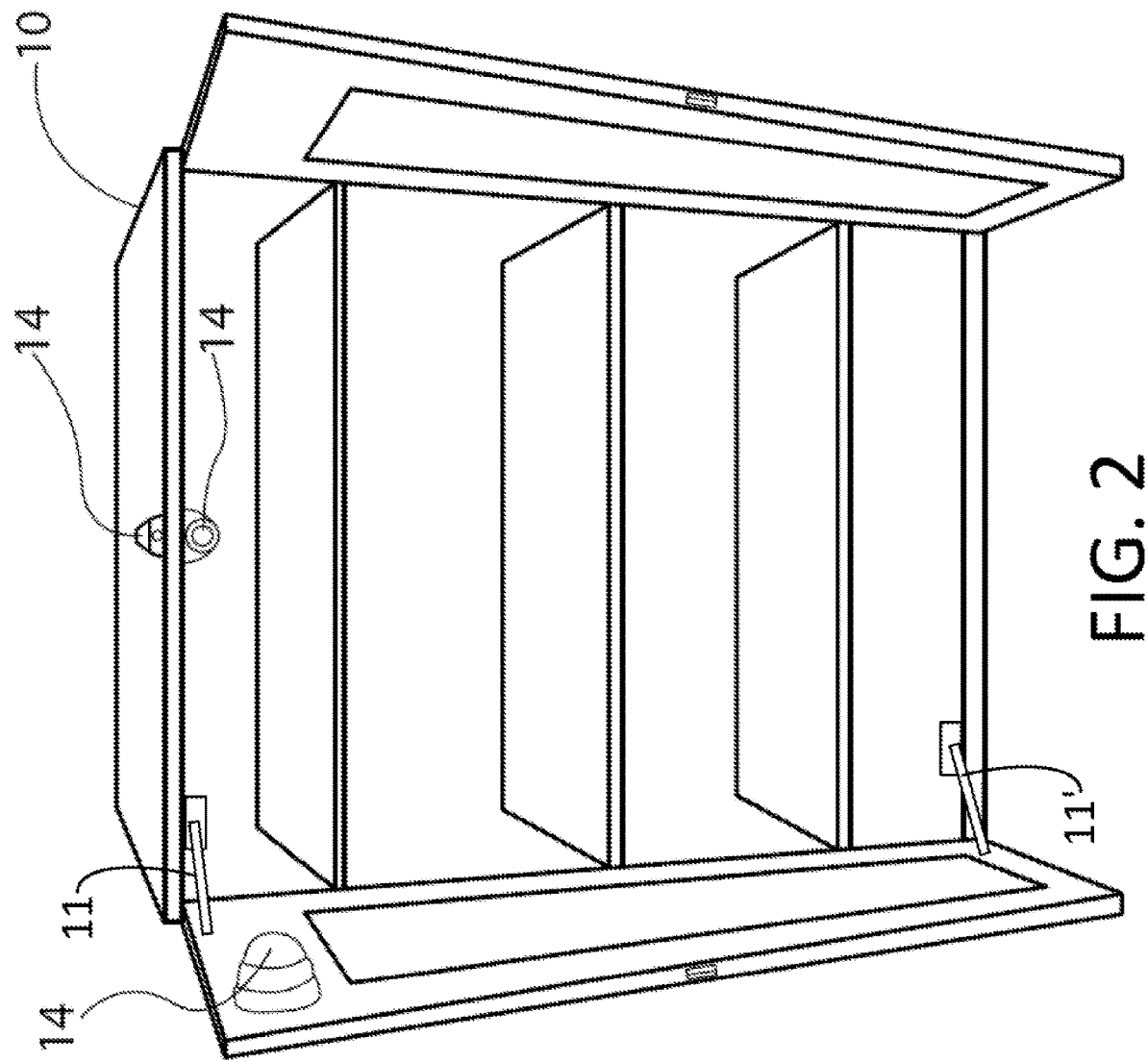
FIG. 2 is an illustration of an embodiment of a system for managing an inventory of items for an environment.
Figure 3:
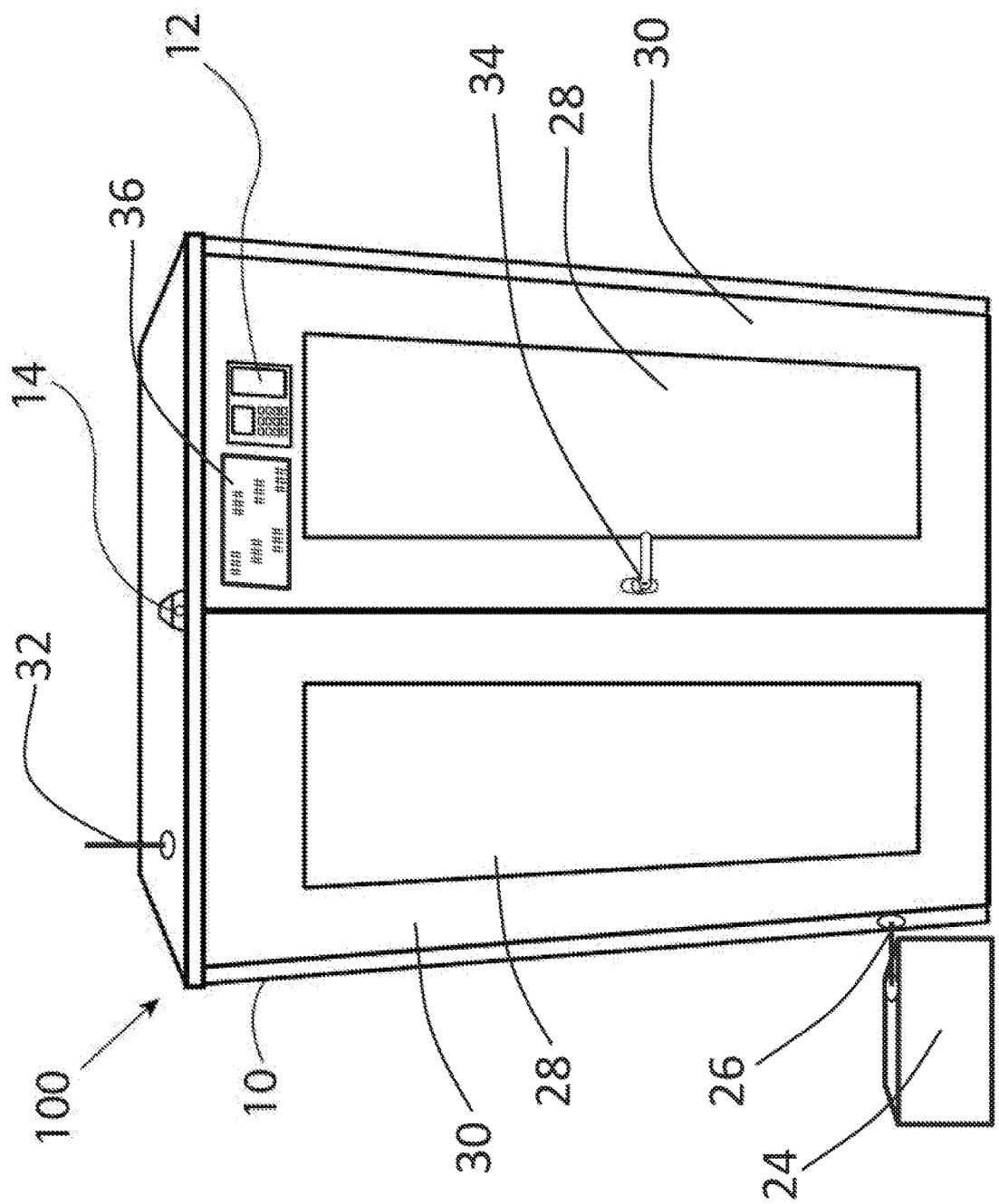
FIG. 3 is an illustration of an embodiment of a system for managing an inventory of items for an environment.

FIG. 1 is an illustration of a system 100 (also referred to as an inventory system) for managing items housed within a storage container 10. FIGS. 1-3 illustrate the storage container 10 and various embodiments of the system 100. In particular, FIG. 1 illustrates the storage container 10 in a closed state (e.g., no access to the internal housing of items) and FIG. 2 illustrates the storage container 10 in an open state (e.g., access to the internal housing of items). The storage container 10 houses one or more items. It is to be appreciated that the items can be any suitable item or good that is used within an environment. For instance, in an office work environment, the item can be an office supply such as, but not limited to, a pen, a ruler, tape, compact disks, DVD's, among others. In another example, the environment can be an industrial work environment, wherein the item can be a tool, a pair of gloves, safety goggles, among others. It is to be appreciated that the subject innovation is intended to include any suitable item that is to be managed and/or tracked to optimize consumption of such item. The storage container 10 can be placed in any suitable location such as personal property or land, ships, drilling rigs, vehicles, hospitals, schools, retail stores, construction sites, mines, among others. In certain embodiments, the storage container 10 can be, for example, a shipping container, a storage pod, a storage container that is towable or pulled by a vehicle, a portable container, a trailer, or a trailer having a storage container coupled thereto or removeably coupled thereto.

The storage container 10 further includes a verification component 12. The verification component 12 is configured to receive a portion of data from a user as input to determine whether the user is allowed access to the storage container and/or inside of the storage container 10 that houses items. In an example, the system 100 can utilize a lookup data table that includes corresponding portions of data for each registered user that has access to the storage container 10. Thus, if a portion of data is received by the verification component 12 and is contained within the lookup table (e.g., corresponding to a user based on a prior registration), the user is allowed access. It is to be appreciated that registration for a user can be employed in various manners and registration techniques are intended to be included with this application.

For instance, a user can access the storage container 10 via the verification component 12 that is configured to receive a portion of data from the user. The portion of data can be, but is not limited to, a portion of biometric data, a code, a number, a letter, a barcode, a proximity sensor via wireless data transfer (e.g., Radio Frequency Identification (RFID), Near Field Communication (NFC), wireless communication via a transmitter and a receiver, among others), a keypad entry, an identification badge, a security badge, among others. By way of example, the biometric data can be a handprint, a fingerprint, a retinal scan of an eye, a portion of facial data of the operator, a height of the operator, a weight of the operator, body-shape of the operator, capacitance of operator based on body-mass index, among others. By way of example, the portion of data can further be, but is not limited to, a username, a password, employee identification, image identification, or a combination thereof. For example, the image identification can be a barcode, a Quick Response (QR) code, a portion of a graphic, a logo, a three-dimensional (3D) barcode, among others.

Embodiments herein can utilize a multi-factor authentication employing two or more verification techniques to access one or more portions of container 10. For example, entered data, biometric data, and other information can be evaluated in combination to complete verification.

Upon verification, the user can be allowed access to the storage container. In a particular example, a lock mechanism 18 is released or engaged based upon whether or not a user is authorized or verified. For instance, a lock mechanism 18 can be a magnetic based lock that is released upon verification of a user to allow access to the storage container. Lock mechanism 18 can be an electronic lock, or a lock with mechanical components that are controlled by associated electronic components. For example, a user is verified by the verification component 12 prior as having access to inside the storage container 10 by, for instance, a thumbprint. Once verified, the storage container 10 allows access to the housed items by releasing or disengaging the lock mechanism 18. As discussed in more detail below, the verification can also activate one or more cameras 14 (also referred to as camera system and/or first camera, second camera, and the like).

The system 100 can further include a first camera focused on the user when opening or accessing the items and a second camera focused on the items housed within the storage container 10. The system 100 can include a controller component 15 that is configured to initiate recording or data collection from the cameras 14 based upon at least one of a verification of the user via the verification component 12 or an unlocking of the lock mechanism 18 based upon approval of the user. In another example, the controller component 15 can initiate recording or data collection based on motion sensing. It is to be appreciated that the controller component 15 can manage the lock mechanism 18 based on the verification component 12, (e.g., access to the storage container 10) as well as, management of tracking items removed or returned to the storage container 10.

In a particular embodiment, the inventory system 100 can include a storage container 10 with shelves at a top position, a middle position, and a lower position respectively. While the illustrated embodiment shows three shelves, any number of shelves can be included. Each shelf can include at least one corresponding camera to capture the area with image or video, in addition to the camera capturing media of the user. Thus, the user is monitored during the interaction with the storage container 10 to identify any removal or return of items to or from the storage container 10. The cameras 14 can collect media (e.g., images, video, and the like) to capture the user and the items as the items are returned or removed from the storage container 10. It is to be appreciated that any suitable number of shelves and/or cameras can be employed with the subject innovation.

In an embodiment, the cameras 14 can be installed inside the storage container 10 such that at least one camera is focused on the user accessing the storage container 10 and one or more cameras are focused on items within the storage container 10 (to track removal or returning). Additionally, the cameras 14 can be remotely controlled to move focus and/or aim to a different location.

In another embodiment, the cameras 14 can be attached to one or more doors (e.g., on the inside of the doors) of the storage container 10, wherein the doors can be limited with motion as to ensure the cameras 14 are focused on at least one of the items in the storage container 10 and/or the user opening or accessing the storage container 10.

The system 100 can further include a scanner 16 (e.g., wireless or hard-wired, also referred to as a scanning device) which is contained or placed within the storage container 10. A user, upon verification and access to the storage container 10 via verification component 12, can utilize the scanner 16 to indicate which items are removed or returned. For instance, a scanning of a first item can indicate the item is being removed and a second scan of the same item can indicate the item is being returned. It is to be appreciated that each item can include a marking component as an identifier to allow tracking of the quantity of each item housed within the storage container. In another embodiment, a device (discussed below) can be used to track removal or return of an item.

In another embodiment, the system 100 can utilize a scale system 46 that is configured to measure a weight of one or more items housed within the storage container 10 and determine whether the number of items changed based on a change in weight. For instance, a number of items can have a first weight and when one or more items are removed or returned, a new weight is detected by a scale system 46 to determine a number of items. This can be utilized in combination or in the alternative of one or more cameras to detect item removal or return.

The scale system 46 can use one or more algorithms to determine the addition or removal of items. For example, upon impulse, the scale system 46 may pause for the weight detected to remain within a threshold (e.g., not varying by more than ten (10) grams) for a preset time (e.g., for three (3) seconds) before an inventory removed or added is calculated. In embodiments, one or more inventory items can be tracked by weight. Various tolerances and thresholds can be employed to accurately track inventory without permitting fraud or abuse. Further, as discussed elsewhere herein, weight can function as one of a multi-factor test to confirm proper inventory tracking. Inventory tracking, including multi-factor inventory tracking, need not deal exclusively with the removal of inventory, but can also confirm or verify return, replacement, or complete use or exhaustion of previously accessed inventory.

The system 100 can further include and/or work in conjunction with a wireless tracking system (not shown) such as, but not limited to, RFID, NFC, or a suitable transmitter and receiver system on each item. The wireless tracking system can be used to track each item and quantities of items housed within the storage container 10. In another example, the cameras 14 can track movement to determine whether or not an item is removed or replaced/returned. Based on the tracked movements, the controller component 15 can manage an inventory within the storage container 10.

In an embodiment, the controller component 15 monitors an amount of the items based on at least one of the scanner 16 and/or recorded media from cameras 14. Additionally, the controller component 15 stores at least one of the portion of data, the scan, the recorded media, and/or any other suitable data from the system 100 to a data store.

It is to be appreciated that the detail of tracking inventory items from the storage container 10 can be any suitable level based on use of the scanner 16, scale system 46, motion sensors, among others. The described storage container 10 can be employed with one or more of the described features in order to tailor to a particular environment. For instance, the system can be employed with cameras when the environment or management of the environment is not concerned with tracking each amount of each item stored in the storage container 10 (e.g., user behavior is influenced by awareness of being recorded). In another embodiment, a camera tracking system can include the scanner 16 as well. In another example, the scale system 46 can be used in combination or in the alternative of the scanner 16. For instance, an environment that includes items that are difficult to track due to size (e.g., small in size) can leverage cameras 14, as well as, the a scale system 46 rather than the scanner 16 (e.g., scanning small items can be difficult due to size).

As alluded, a variety of techniques can be employed to track inventory within the system 100. In order to more accurately track inventory present, added, or removed, inventory can be marked in one or more ways facilitating accurate identification. Accurate identification can include a multi-factor test applied based on activity related to the container 10 (e.g., weight on scale reduced or increased, motion sensed, and others). For example, a blue pen can be accidentally replaced or bumped into the area designated for red pens. In this example, the weight of each red pen and blue pen is similar and a motion detection may be used to accurately track the inventor for the red pens and blue pens. Moreover, the total weight of all the items in a designated area can be detected as well as the total weight of all items in an area surrounding or proximate so as to detect any changes in weight that are based on an item being placed in an area not designate for that item.

will result in an inaccurate inventory for both the red pens and the blue pens or pencils. Such activity may thwart highly accurate inventory management.

In an embodiment, the system 100 can utilize a marking component (not shown) as an identifier. Marking can include any combination of stickers, tags, bands, and other attachments or treatments. Such marking can relate to color coding, defining reflective portions, defining portions having a known infrared signature, including different patterns, including magnetic portions, and so forth. Various machine vision techniques can be employed alone or in combination with scanners (e.g., scanner 16) or sensors (e.g., detectors used in combination with RFID technology, magnets, light intensity, and so forth) to accurately identify specific inventory items.

Additional means for identifying the removal or replacement of particular items can include inventory holder 48. Inventory holder 48 can be a standalone device or integrated into one or more portions of container 10. Inventory holder 48 can include one or more mechanical or electrical means to detect the presence or absence of an item. For example, inventory holder 48 can retain a plurality of thumb drives. Based on whether a thumb drive is present, a mechanical closure may be held open, or an electrical circuit may be held open, such that removal of the thumb drive closes the apparatus or circuit, triggering a signal to indicate the thumb drive was removed. In embodiments, inventory holder 48 can be specially sized or configured to accept a specific inventory item. In alternative or complementary embodiments, inventory holder 48 can be adapted to accept a plurality of different items simultaneously or at different times.

The system 100 can include a first power source 22 and a backup power source 24 to provide power thereto. For instance, a first power source 22 can provide power to the system 100 from a main line of power, wherein a backup power source 24 can provide power as a backup system in the event power is unobtainable via the main line of power. For instance, the backup power source 24 can be, but is not limited to, a battery power source. In an embodiment, one or more of first power source 22 and/or backup power source 24 can provide surge protection to prevent damage or outages. In an embodiment, the backup power source 24 can operate as the power supply for continued extended use in the event the primary power supply (e.g., wired AC power) is interrupted in the environment around the storage container 10 (e.g., a property where storage container 10 is deployed may experience a property-wide power outage, but backup power source 24 prevents impact on operational capability of storage container 10 and/or components thereof).

Backup power source 24 also allows system 100 to be moved without interruption (e.g., powering down) of one or more electrically powered components. First power source 22 can be a primary (e.g., wired AC power) cord, and this cord may be disconnected (e.g., from a wall plug). Backup power source 24 can keep system 100 energized until first power source 22 is reconnected. First power source 22 can be reconnected in a different location after moving system 100.

In embodiments, backup power source 24 can be, at least in part, outside container 10. In alternative embodiments, backup power source 24 can be stored within container 10 (not pictured). In still additional alternative or complementary embodiments, backup power source 24 can include multiple components or sources, some of which are stored in container 10, and some of which exist outside container 10. Power cable 26 can link backup power source 24 to the power line through which first power source 22 or another power supply energizes the components of system 100.

The system 100 can further include a notification component 20 that is configured to communicate a notification or signal. The notification component can generate at least one of an audible signal, a visible signal, a haptic signal, a wireless signal to another component or device, an email notification, among others. The notification component 20 can be customized to transmit or display a signal based upon at least one of a repair needed, a maintenance needed, a duration of time lapsed, a replenishment of inventory needed, a theft, an unauthorized access, a detected tampering (e.g., shaking, force detected, among others), and the like. For instance, upon an item being below defined quantity, a signal can be communicated to replenish such item. Each time a signal is communicated or displayed from notification component 20, it can be logged into a data store.

System 100 can include a communications component 54. Communications component 54 can facilitate one or more techniques of wired or wireless data communication to transfer information for storage or analysis, transmit notifications, facilitate remote access, et cetera. In embodiments, communications component 54 can be enclosed within container 10. In alternative or complementary embodiments, communications component 54 exists, at least partially, outside container 10. In another example, communications component 54 can be substantially housed in container 10, but include an external link, such as antenna 32, external wiring, or other techniques.

The system 100 can further include a remote access to at least one of the storage container 10, the lock mechanism 18, the verification component 12, the cameras 14, the controller component 15, the scanner 16, the power source 22, the backup power source 24, the notification component 20, the communications component 54 or a combination thereof. The remote access allows control of the system 100 from a location other than at the storage container 10. For instance, a remote access can allow control of the storage container 10 from a computer in a different physical location in comparison to the location of the storage container 10. In another embodiment, a remote access can be from one network to a second network hosting the storage container 10. It is to be appreciated that the network can be any suitable network such as, but not limited to, a wireless network, LAN, WAN, Ethernet, Wi-Fi, local, remote, cloud-based, or a combination thereof. The remote access can be utilized to manage video capture or media capture, access to the storage container 10, turn on or off components, unlock or lock the storage container 10, move or adjust cameras 14, access the scanner 16, communicate a signal from the notification component 20, among others. In another example, a remote access can be utilized to provide trouble-shooting (including, e.g. off-site trouble-shooting) to the system 100.

The system 100 can further be utilized to analyze usage, patterns, or purchases of items based on the data collected related to items removed, returned, used, consumed, among others. For instance, a number of items in the storage container can be determined to have a particular lifetime or last a specific amount of time based on historical data. Additionally, historical data can be used to determine a user that is consuming or using too much of an item. It is to be appreciated that inventory data collected can be used in various applications and is intended to be included with the subject innovation. In an embodiment, the controller component 15 is configured to provide an estimation of consumption for a plurality of items (e.g., the first item or the second item) based upon collected historical data related to removal of items from the storage container.

In an example, a user can interact with the storage container 10 with a device, wherein the interaction can be a verification (e.g., via verification component 12) or a logging of items (e.g., using a device, such as a scanner 16). It is to be appreciated that the device can be, but is not limited to being, a computer, a desktop machine, a tablet, a portable device, a portable digital assistant, a smartphone, a laptop, a computing device, a portable gaming device, a game console, a device that can access the Internet, a kiosk, a terminal, a display, a surface computing device, smart glass, a surface that interacts with a user's motion or touch, and the like.

Figure 5:
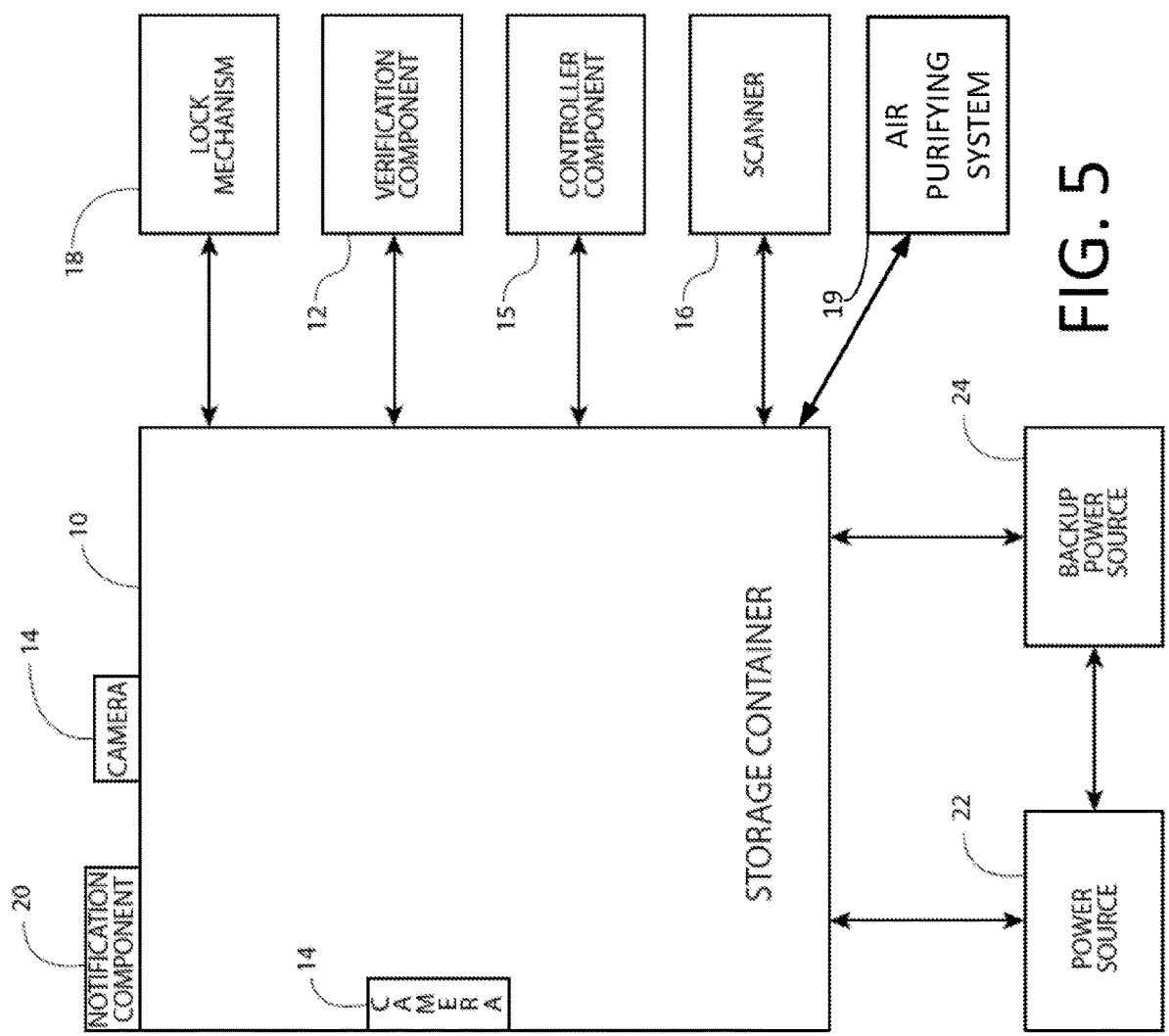
FIG. 5 is an illustration of a block diagram of a system for managing an inventory of items for an environment.

Although not depicted in FIG. 1, it is to be appreciated that, in an embodiment, the controller component 15 can be a stand-alone component (as depicted in FIG. 5), incorporated into the storage container 10, or a suitable combination thereof. Similarly, it is to be appreciated that, in an embodiment, the verification component 12 can be a stand-alone component (as depicted FIG. 5), incorporated into the storage container 10, or a suitable combination thereof. Similarly, it is to be appreciated that, in an embodiment, the lock mechanism 18 can be a stand-alone component (as depicted in FIG. 5), incorporated into the storage container 10, or a suitable combination thereof. Similarly, it is to be appreciated that, in an embodiment, the camera(s) 14 can be a stand-alone component (as depicted in FIG. 5), incorporated into the storage container 10, or a suitable combination thereof. Similarly, it is to be appreciated that, in an embodiment, the power source 22 and/or backup power source 24 can be stand-alone components (as depicted), incorporated into the storage container 10, or a suitable combination thereof. Similarly, it is to be appreciated that, in an embodiment, the notification component 20 can be a stand-alone component (as depicted in FIG. 5), incorporated into the storage container 10, or a suitable combination thereof. In various embodiments, other components (e.g., scanner 16, scale system 46, inventory holder 48, power cable 26, communication component 54) can be stand-alone components, incorporated into storage container 10, or combinations thereof.

The system 100 can store media from cameras, portions of data from users, registration data, inventory information, item data, among others in a data store. It is to be appreciated that the data store can be, for example, either volatile memory or nonvolatile memory, or can include both volatile and nonvolatile memory. The data store of the subject systems and methods is intended to comprise, without being limited to, these and other suitable types of memory. In addition, it is to be appreciated that the data store can be a server, a database, a hard drive, a flash drive, an external hard drive, a portable hard drive, a cloud-based storage, a solid-state drive, and the like. The data store can further be a local data store, a remote data store, a cloud-based data store, or a combination thereof.

Specifically shown in FIG. 3, system 100 can include display component 36 mounted to container 10. Display component 36 can display any information, including information related to container 10, its inventory, users, and other containers. In embodiments, display component 36 can display the inventory contained in summary or item-by-item. In some embodiments, display component 36 can display a status of container 10 related to its function (e.g., offline or requiring service) or its inventory (e.g., items checked out or exhausted). In the event that container 10 requires service (e.g., damaged, inventory requiring replenishment), display component 36 can display the location of nearby containers with one or more desired inventory items. Display component 36 can be couple with one or more other components (e.g., processors, memory) to receive data related to the information presented on display component 36.

In alternative or complementary embodiments, display component 36 can display information about an inventory item, user, or group of users. For example, inventory information can include information about an inventory item, its cost, its expected lifespan or usage, and others. In embodiments, a user's inventory usage can be displayed, such as the number or value of items utilized. In embodiments, display component 36 can facilitate an account system where credits or debits are tracked by user. In particular embodiments, the user can be given an inventory "allowance" where they will be prevented from accessing additional inventory items after debits exceed a threshold. Finally, users or groups of users can be displayed on display component 36 in terms of their total usage or efficiency, or comparative usage or efficiency in view of other users or groups.

Container 10 can include panels 28. In embodiments, panels 28 can be transparent or opaque. In such embodiments, panels 28 can enable viewing of at least a subset of inventory items in container 10. In alternative embodiments, one or both of panels 28 are solid, preventing view into container 10.

Closure 34 can be used to manually actuate opening or closing of container 10 once verification is complete via verification component 12.

Figure 4:
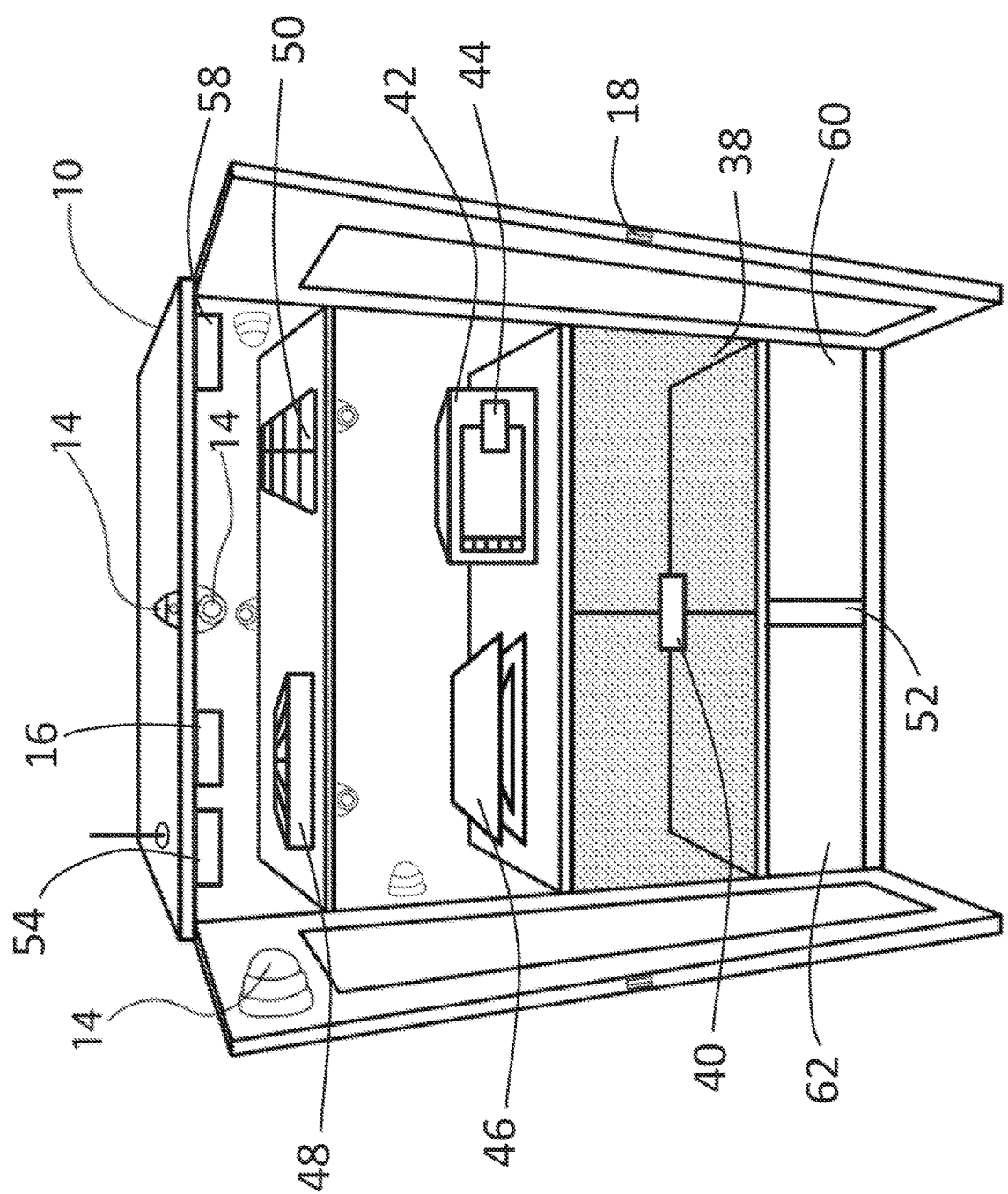
FIG. 4 is an illustration of an embodiment of a system for managing an inventory of items for an environment.

With specific reference to FIG. 4, other aspects are depicted. As shown, a plurality of cameras and motion sensors can be included without regard for their type, position, or arrangement. Container 10 may include motor component 58, which can automatically open or close one or more security features of container 10. For example, motor component 58 can open one or both doors based on a verification. Motor component 58 can be used alone or in combination with one or more camera(s) 14 (or other sensors). For example, when used with camera(s) 14, logic employing imagery from camera(s) 14 (or other sensors) can be used to prevent harm to users or damage to inventory based on opening or closing of container 10.

Container 10 may include vending component 50. Vending component 50 may, upon proper verification via verification component 12 (or other components), dispense one or more inventory items to a manual retrieval. Vending component 50 may be integrated into container 10, or may be a standalone device placed therein. For instance, the vending component 50 can automatically release an item stored in the container 10 based upon verification, authentication, and the like. For instance, the vending component 50 can include multiple items with each item secured, wherein upon authentication or verification, one of the multiple items can be automatically dispensed to a user. It is to be appreciated that the automatic dispensing of the item from the container 10 can include at least unlocking, unsecuring, releasing, delivering, or providing the item to the user.

Container 10 may include one or more security sector components 38. Security sector 38 is secured by sector locking component 40. Based on verification via verification component 12 (or other components, including manual locks), security sector 38 may be unsecured to access contents. In this regard, security sector 38 can store specific inventory items whereby a user who does not have verification credentials to access security sector 38 can still access the remainder of container 10.

Container 10 may also include security box 42 having a box locking component 44. Like sector locking component 40, box locking component 44 can be secured or unsecured based on one or both of verification information from verification component 12 or other mechanisms. Box component can be fixed or movable within container 10, and deny at least a portion of users access to contents of security box 42 while still permitting access to the remainder of container 10.

Container 10 can include single sides 60 and 62 separated by divider 52. Divider 52 prevents a user from accessing single side 60 or 62 when the door or closure covering this side is secured. For example, a verification via verification component 12 can unsecure one door or half of container 10, allowing a user to access only the permitted portions of container 10. By separating single sides 60 and 62, divider 52 denies users lacking adequate verification level from accessing one side and the inventory associated therewith.

The aforementioned systems, components, (e.g., storage container 10, camera(s) 14, verification component 12, controller component 15, scanner 16, lock mechanism 18, notification component 20, power source 22, backup power source 24, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

In an embodiment, an inventory system 100 is provided with the portion of data being at least one of a biometric data of the user, a barcode, an identification badge, a number, a code, a face detection of the user, a fingerprint of the user, or a wireless communication from the user. In an embodiment, the inventory system 100 further includes a power source 22 that supplies a portion of power to at least one of the wireless scanning device 16, the camera system 14, the controller component 15, or the lock mechanism 18. In an embodiment, the inventory system 100 further includes a backup battery power source 24 that supplies a portion of power upon the interruption of power to the power source 22.

In an embodiment, the inventory system 100 further includes a scale system 46 that measures a weight associated with at least one of the first item or the second item to determine at least one of the first amount or the second amount. In an embodiment, the inventory system 100 further includes a notification component 20 that is configured to communicate a notification based upon at least one of a service call, a maintenance, a repair, or a replenishment of the first item or the second item.

In an embodiment, the inventory system 100 further includes the wireless scanning device providing a scan of a portion of the first item or a portion of the second item to indicate a return to the storage container 10, wherein the controller component 15 is further configured to monitor the return of at least one of the first item or the second item. In an embodiment, the inventory system 100 further includes a camera system 14 that detects movement from the user to determine at least one of a removal or a return of at least one of the first item or the second item.

As described above, a first camera can focus on a user in proximity to inventory system 100. A second camera may focus on at least a first area inside the storage container. In an embodiment, the camera system 14 further includes a third camera and a fourth camera, wherein the third camera focuses on a second area inside the storage container, and the fourth camera focuses on a third area inside the storage container. Additional cameras may be provided to focus on other areas in some embodiments. In an embodiment, the controller component 15 is further configured to provide an estimation of consumption for at least one of the first item or the second item based upon collected historical data related to removal of the first item or the second item from the storage container 10.

In an embodiment, the system 100 can emit a signal in the event the door of storage container 10 remains open (or is improperly closed) for a specified duration of time (e.g., 35 seconds, among others) after being permitted to open (e.g., via verification component 12 and/or lock mechanism 18). For example, container 10 can alert via a signal in the event a user forgets to close or incorrectly closes the door to access container 10. In this example, the alert signal indicates to those in the vicinity of container 10 that the door needs to be closed.

In an embodiment, an inventory management system 100 is provided that includes at least the following: a container 10 with at least one open side; doors 30 including at least a first door that closes a first portion of the open side; a second door that closes a second portion of the open side; a locking component 18 that secures the first door and the second door; a verification component 12 that selectively un-secures and re-secures at least one of the first door and the second door based on a verification input, wherein the verification input controls the locking component 18; an inventory tracking component that assesses an inventory quantity within the container; and a controller component 15 that records the inventory quantity to a database.

In the embodiment, the container can include a display component 36 that displays information related to at least one of a user associated with the verification input, the inventory quantity, the inventory management container, or a group of users, wherein the display component 36 is at least one of accessible outside the container or viewable from a user in front of the first door or the second door. In the embodiment, the container 10 can include a first power source 22 and a second power source, wherein at least one of the first power source 22 and the second power source is a battery backup 24. In the embodiment, the at least one of the first power source 22 and the second power source is enclosed within the container 10.

In the embodiment, at least one of the first door and the second door is at least partially transparent (panels 28, or other portions). In the embodiment, the container 10 can include a security sector, wherein the verification component 12 selectively un-secures and re-secures the security sector based on the verification input. In the embodiment, the inventory tracking component includes a scale component 46 that ascertains an item within the container 10 based on at least a weight of the item. In the embodiment, the inventory tracking component includes an inventory holder 48 that holds an item within the container 10. In the embodiment, the inventory tracking component includes a vending component 50 that automatically dispenses an item from the container 10 to a user.

In an embodiment, a system is provided that includes at least the following: means for retaining an inventory in an enclosure; means for verifying a user requesting the inventory with a user verification; means for permitting access to the enclosure based on the user verification; means for capturing an image related to the user; means for capturing an image related to the inventory; means for determining removal of the inventory; and means for recording removal of the inventory in a data. It is to be appreciated that an enclosure is a housing that includes a volume. It is to be appreciated that any enclosure or container can be chosen with sound engineering judgment without departing from the intended scope of the subject innovation.

Figure 6:
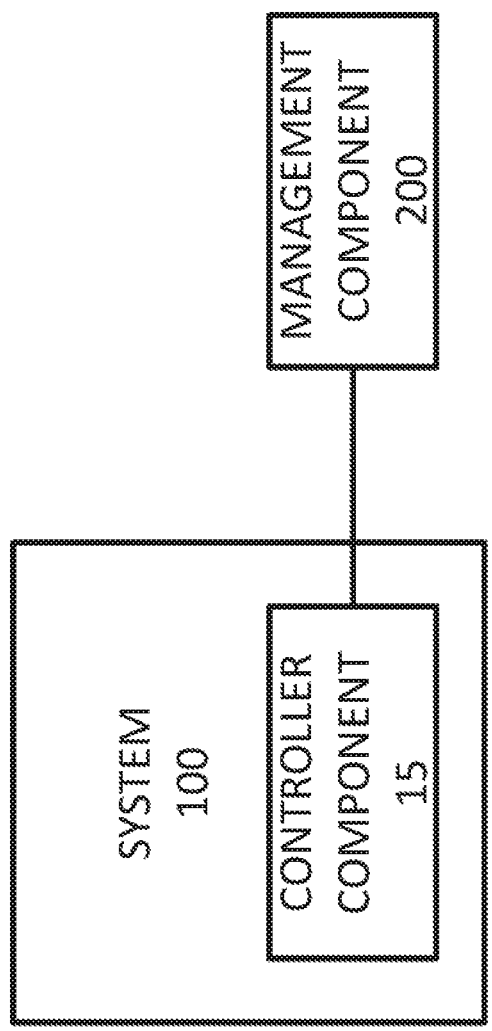
FIG. 6 is an illustration of a block diagram of components used for inventory management.

Turning to FIG. 6, illustrated is an extension of system 100 whereby a management component 200 receives information from (and, in embodiments, transmits information to) controller component 15. Specifically, management component 200 can receive inventory information, location information, user information, group information, and other data that can be used in inventory management. Management component 200 can track and forecast inventory usage, and be used to automate service or replenishment to container 10. Management component 200 can analyze container 10 and inventory utilization for a single container 10 or across an enterprise in multiple locations and with different users and/or functional groups. Management component 200 can identify trends, and flag users, locations or groups which are statistically aberrant in terms of unusually high usage, replenishment requirements, or service. Fraud or theft can be tracked. Coordination between multiple containers (e.g., container 10 and another container) in terms of ordering inventory, replenishment, service, et cetera, can be effected.

Management component 200 can track efficiency or usage by individual user or group, and provide reports related thereto. Further, users may utilize container 10 to request particular inventory not present or submit messages to personnel involved in inventory management, which can be enabled using communication between controller component 15 and management component 200.

Management component 200 can improve enterprise efficiency by reducing inventory replenishment costs. For example, in addition to forecasting and tracking usage within the enterprise, management component 200 can track and forecast pricing from inventory suppliers. Pricing trends, bulk offers, alternative suppliers, coupons, et cetera, can be tracked using network connections, and management component 200 can identify opportune times for the enterprise associated with container 10 to save costs by buying or delaying purchase of inventory. In embodiments, strike conditions can be manually set or inferred by management component 200, and purchasing can be automated using management component 200. Ultimately, resource planning related to at least the inventory stored in container 10 and associated devices can be effected using management component 200.

Figure 7:
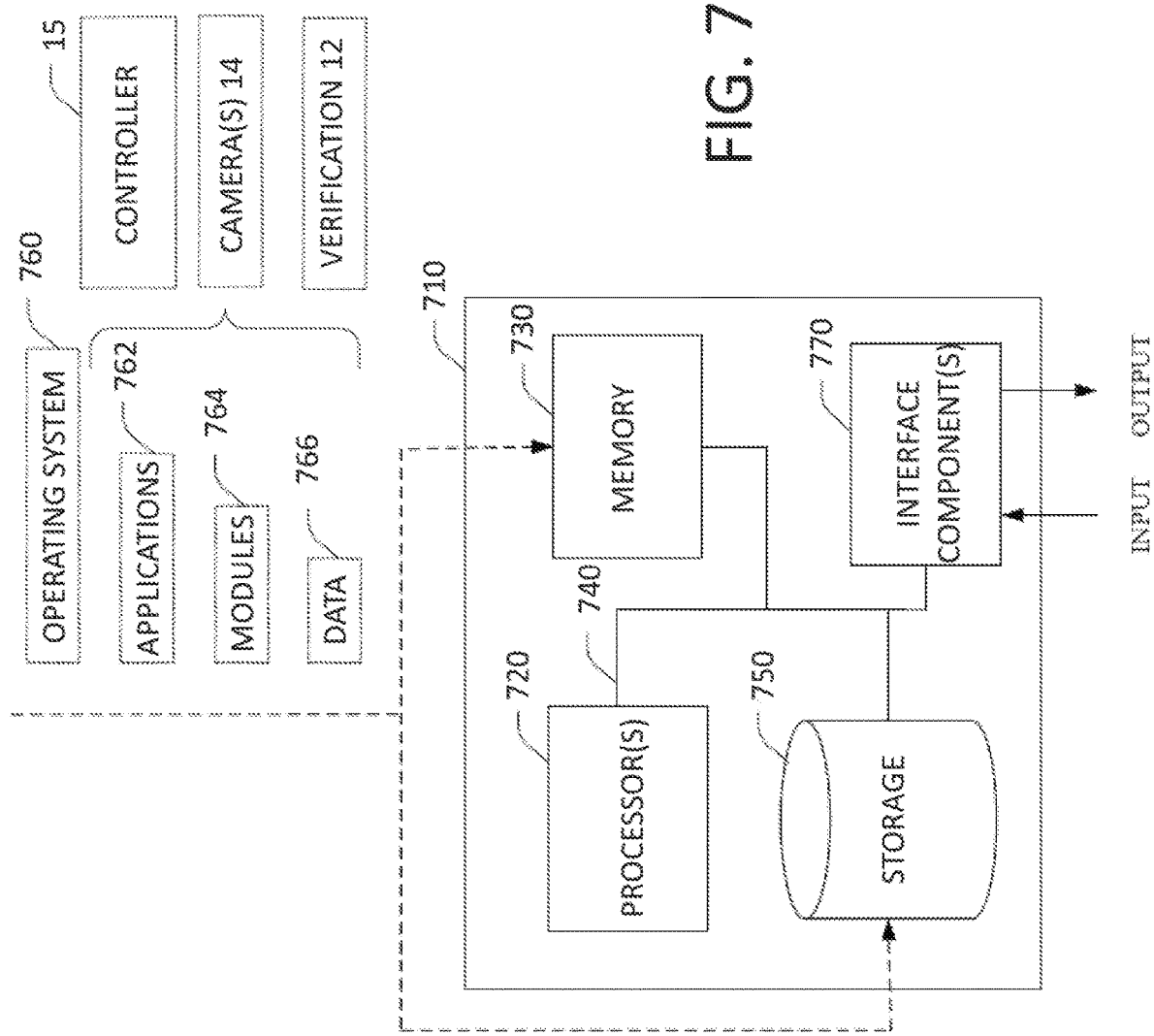
FIG. 7 is an illustration of a block diagram of a computing environment for use herewith.

With reference to FIG. 7, illustrated is an example general-purpose computer 710 or computing device (e.g., desktop, laptop, server, hand-held, programmable consumer or industrial electronics, set-top box, game system, et cetera). The computer 710 includes one or more processor(s) 720, memory 730, system bus 740, mass storage 750, and one or more interface components 770. The system bus 740 communicatively couples at least the above system components. However, it is to be appreciated that in its simplest form the computer 710 can include one or more processors 720 coupled to memory 730 that execute various computer executable actions, instructions, and or components stored in memory 730.

The processor(s) 720 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 720 may also be implemented as a combination of computing devices, for example a combination of a DSP and a microprocessor, a plurality of microprocessors, multi-core processors, one or more microprocessors in conjunction with a DSP core, or any other such configuration.

The computer 710 can include or otherwise interact with a variety of computer-readable media to implement one or more aspects of the claimed subject matter. The computer-readable media can be any available media that can be accessed by the computer 710 and includes volatile and nonvolatile media, and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to memory devices (e.g., random access memory (RAM), read-only memory (ROM), electrically erasable programmable read-only memory (EEPROM), et cetera), magnetic storage devices (e.g., hard disk, floppy disk, cassettes, tape . . . ), optical disks (e.g., compact disk (CD), digital versatile disk (DVD), et cetera), and solid state devices (e.g., solid state drive (SSD), flash memory drive (e.g., card, stick, key drive, et cetera), et cetera), or any other medium which can be used to store the desired information and which can be accessed by the computer 710.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 730 and mass storage 750 are examples of computer-readable storage media. Depending on the exact configuration and type of computing device, memory 730 may be volatile (e.g., RAM), non-volatile (e.g., ROM, flash memory . . . ) or some combination of the two. By way of example, the basic input/output system (BIOS), including basic routines to transfer information between elements within the computer 710, such as during start-up, can be stored in nonvolatile memory, while volatile memory can act as external cache memory to facilitate processing by the processor(s) 720, among other things.

Mass storage 750 includes removable/non-removable, volatile/non-volatile computer storage media for storage of large amounts of data relative to the memory 730. For example, mass storage 750 includes, but is not limited to, one or more devices such as a magnetic or optical disk drive, floppy disk drive, flash memory, solid-state drive, or memory stick.

Memory 730 and mass storage 750 can include, or have stored therein, operating system 760, one or more applications 762, one or more program modules 764, and data 766. The operating system 760 acts to control and allocate resources of the computer 710. Applications 762 include one or both of system and application software and can exploit management of resources by the operating system 760 through program modules 764 and data 766 stored in memory 730 and/or mass storage 750 to perform one or more actions. Accordingly, applications 762 can turn a general-purpose computer 710 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example, and not limitation, controller component 15, cameras 14, verification component 12, other components or aspects herein, or portions thereof, can be, or form part of, an application 762, and include one or more program modules 764 and data 766 stored in memory 730 and/or mass storage 750 whose functionality can be realized when executed by one or more processor(s) 720.

In accordance with one particular embodiment, the processor(s) 720 can correspond to a system on a chip (SOC) or like architecture including, or in other words integrating, both hardware and software on a single integrated circuit substrate. Here, the processor(s) 720 can include one or more processors, as well as, memory at least similar to processor(s) 720 and memory 730, among other things. Conventional processors include a minimal amount of hardware and software and rely extensively on external hardware and software. By contrast, a SOC implementation of processor is more powerful, as it embeds hardware and software therein, that enables particular functionality with minimal or no reliance on external hardware and software. For example, the controller component 15, the cameras 14, verification component 12, and/or associated functionality can be embedded within hardware in a SOC architecture.

The computer 710 also includes one or more interface components 770 that are communicatively coupled to the system bus 740 and facilitate interaction with the computer 710. By way of example, the interface component 770 can be a port (e.g. serial, parallel, PCMCIA, USB, FireWire, et cetera) or an interface card (e.g., sound, video, et cetera) or the like. In one example implementation, the interface component 770 can be embodied as a user input/output interface to enable a user to enter commands and information into the computer 710 through one or more input devices (e.g., pointing device such as a mouse, trackball, stylus, touch pad, keyboard, microphone, joystick, game pad, satellite dish, scanner, camera, other computer, et cetera). In another example implementation, the interface component 770 can be embodied as an output peripheral interface to supply output to displays (e.g., CRT, LCD, plasma . . . ), speakers, printers, and/or other computers, among other things. Still further yet, the interface component 770 can be embodied as a network interface to enable communication with other computing devices (not shown), such as over a wired or wireless communications link.

Figure 8:
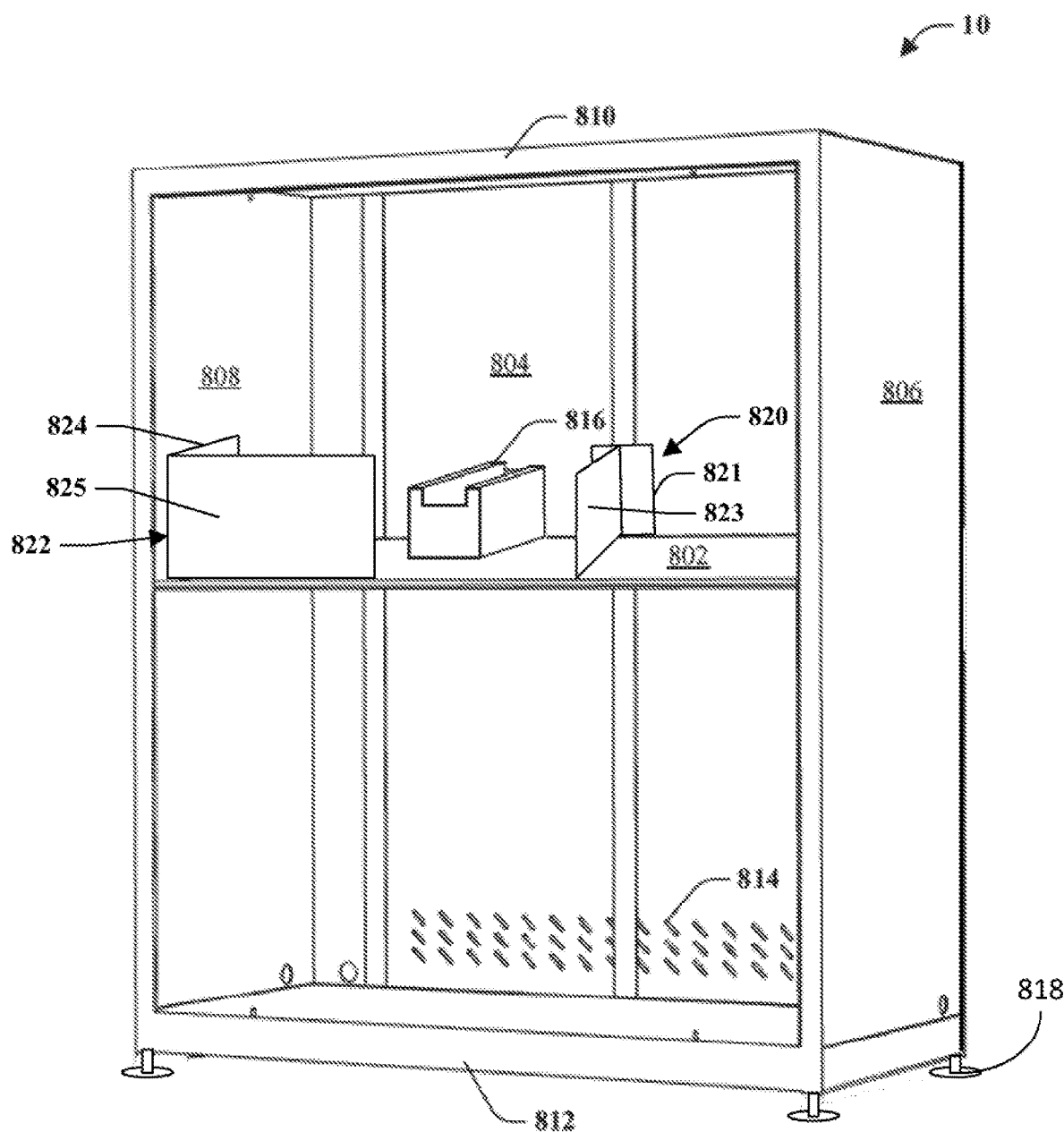
FIG. 8 is an illustration of an embodiment of a system for managing an inventory of items for an environment.
Figure 9:
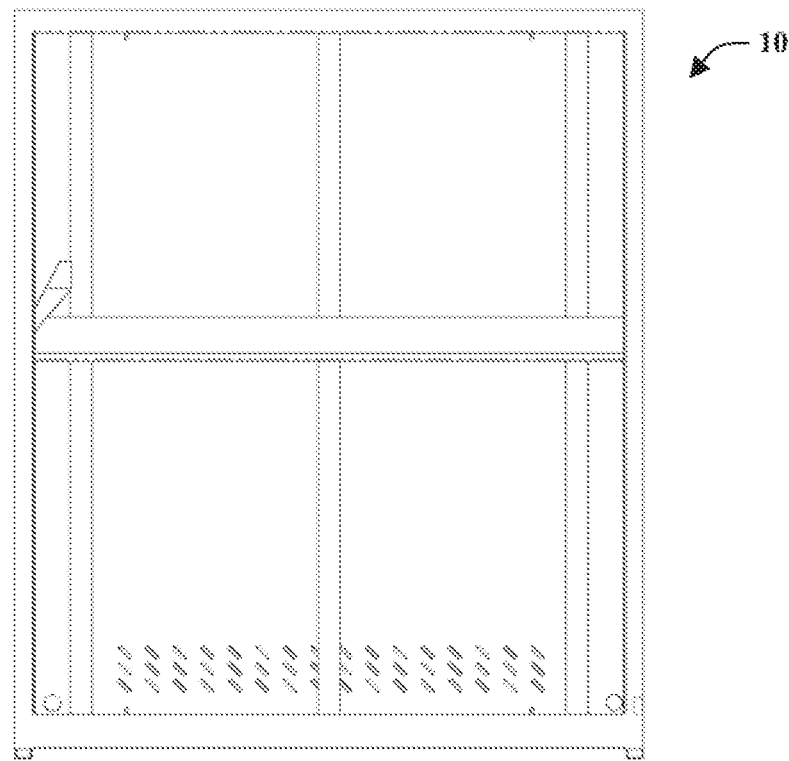
FIG. 9 is an illustration of a front view of an embodiment of a system for managing an inventory of items for an environment.
Figure 10:
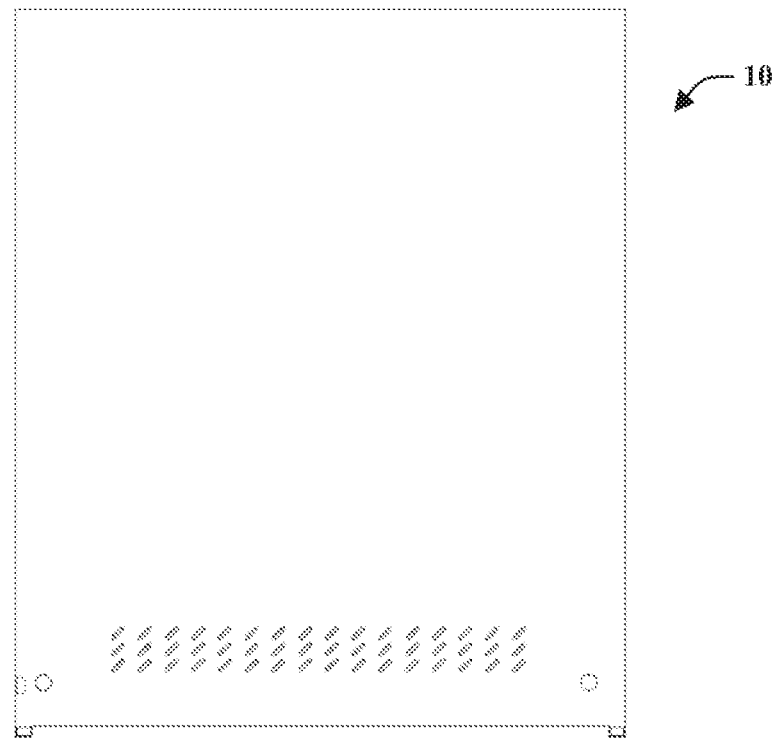
FIG. 10 is an illustration of a rear view of an embodiment of a system for managing an inventory of items for an environment.
Figure 11:
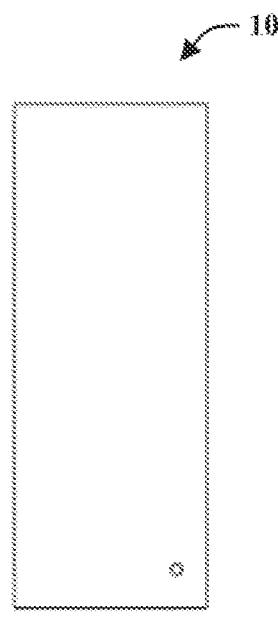
FIG. 11 is an illustration of a side view of an embodiment of a system for managing an inventory of items for an environment.
Figure 12:
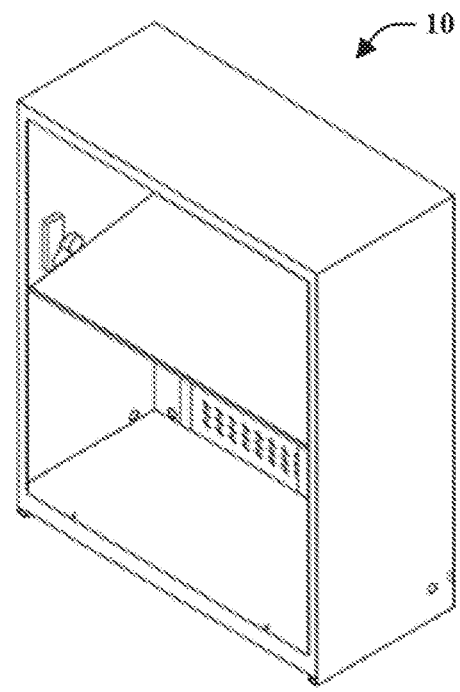
FIG. 12 is an illustration of a top right perspective view of an embodiment of a system for managing an inventory of items for an environment.
Figure 13:
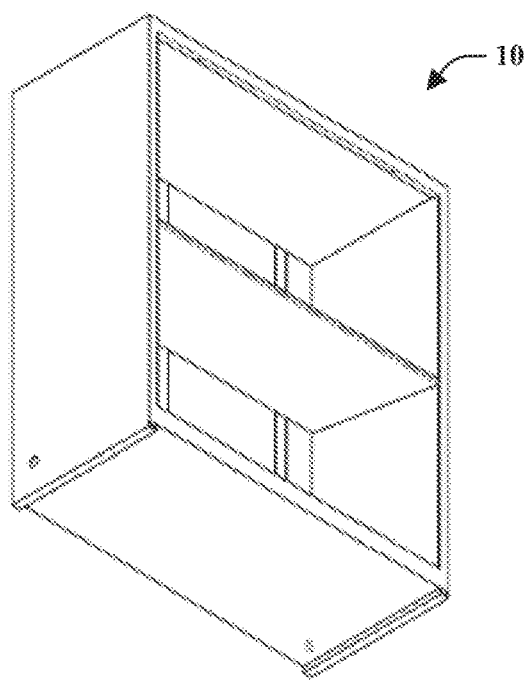
FIG. 13 is an illustration of a bottom left perspective view of an embodiment of a system for managing an inventory of items for an environment.

Turning to FIGS. 8-13, the storage container 10 is illustrated in another embodiment. The storage container 10 is illustrated without hinged doors in FIGS. 8-13 and it is to be appreciated based on at least the above description that the storage container 10 can include two or more doors hinged thereto. For example, each door can include one or more cameras attached or removeably coupled to a corner of an interior side of the door or a center edge of an interior side of one of the doors. FIG. 9 illustrates the storage container 10 in a front view. FIG. 10 illustrates the storage container 10 in a rear view. FIG. 11 illustrates the storage container in a right side view (with the left side view being a mirror image of the right side view. FIG. 12 illustrates the storage container 10 in a top perspective view. FIG. 13 illustrates the storage container 10 in a bottom perspective view.

The storage container 10 can be configured to vend a stored item to a user based on verification of the user, unlocking the doors, and monitoring access of the user and/or the stored item before verification, during verification, during access, and after the doors are secured. In a particular example, the storage container 10 can be energy efficient by maintaining a low energy state. The low energy state can include having cameras off, internal lighting off, and powering only the controller component 15 and/or the verification component 12. Upon verification of a user or upon activation of a keypad or screen that communicates with a user to determine verification, a camera, fixed to an exterior of the storage container 10, can be activated to capture who accesses or activated the keypad or screen to begin verification. After verification, the locks for the doors can be deactivated. Upon deactivation of the doors, a sensor can detect when a door is opened to power or activate one or more cameras that monitor the contents of the storage container 10. The cameras can be located on an interior side of at least one door and preferably in a corner (opposite of a hinged side) of a door or at a center edge (opposite of a hinged side) of a door. The cameras can be aimed to the internal area of the storage container 10 when the doors are approximately at a 90 degree in comparison to a front side of the storage container 10. As discussed, the storage container 10 includes a motion limiting device that restricts motion of at least one door so as to provide a line of site for the camera. This allows a camera to capture what is being taken out of the storage container 10.

The storage container 10 can include a first sidewall 806, a second sidewall 808 opposite the first sidewall 806, a top 810, a bottom 812 opposite the top 810, and a backwall 804. Inside the storage container 10 can include one or more shelves 802. The shelf or shelves 802 can support one or more items and in particular, can support a container 816. The container 816 can house one or more items that are secured in the storage container 10. As discussed above, the shelf 816 can include a corresponding camera on an interior side of a door to capture whether items have been removed from the container 816. The camera can be at a height location on the interior side of the door that corresponds to a height of the shelf 816 inside the storage container 10.

The shelf or shelves 802 can be removeably coupled to an inside wall (e.g., backwall 804, first sidewall 806, second sidewall 808, top 810, bottom 812). For instance, an overlapping configuration (e.g., edge fitting or supported by a hook on an inside wall) can be used in which an edge of the shelf 802_can be engaged into a hook coupled or integrated onto the inside wall. In another embodiment, the shelf 802_can be stationary and non-removeably affixed by a weld. In addition to an overlapping configuration, the shelf 802_can be removeably coupled to the storage container 10 or inside the storage container 10 by a screw, bolt, weld, tongue and groove configuration, hook configuration, peg configuration, and the like.

The shelf 802 can be angled or slanted to allow for at least one of a line-of-site for a camera or for a user, wherein the line-of-site allows for a view into the storage cabinet 10 and the container 816. The shelf 802 can include a rectangular shape in which there is a front side (e.g., closest to the front of the storage container 10) and a backside (e.g., closest to the back of the storage container 10) opposite the front side. The backside can be raised a distance above the front side of the shelf 802. In particular, the inside walls can include a first set of hooks on two or more locations on the inside walls on a first plane and a second set of hooks on two or more locations on the inside walls on a second plane, wherein the first plane and the second plane can be separated by a distance. The distance can be above or below in which the first plane can be higher than the second plane or the second plane can be higher than the first plane. It is to be appreciated that there can be a number of planes for the sets of hooks so as to customize the distance between one or more shelves and/or the angles of the shelves 802. For instance, a front side of the shelf 802 can be affixed to a first set of hooks on a first plane and the backside of the shelf 802 can be affixed to a second set of hooks on a second plane, wherein the second plane is a distance above the first plane providing an angle in comparison to a ground level of where the storage container 10 is located. Based on which hooks the edge of the shelf is engaged into can translate into a level shelf (e.g., level compared to a ground level) or a raised shelf 802 (where the backside of the shelf 802 is raised higher than the front side of the shelf 802), or a lowered shelf (where the front side of the shelf 802 is higher than the backside of the shelf 802). It is to be appreciated that the height of the shelf 802 can be manually adjusted, automatically adjusted, or a combination thereof.

In order for the container 816 to be stationary on a raised or angled shelf 802, the container 816 can include a magnet 1410 to maintain a location of the container 816 on the shelf 802. The magnet 1410 can be affixed to a bottom of the container 816, wherein the magnetism to a metal or metallic-based shelf 802 allows restriction of movement. The magnet 1410 can be affixed to a suitable location on the container 816. In an embodiment, the magnet 1410 can be affixed to the container 816 with a glue, epoxy, an adhesive, and the like. The storage container 10 can include one or more containers 816 each having a magnet or magnets to allow for customized layouts for containers and such layouts have restricted movement due to the magnetism to the shelf 802. The storage container 10 can include an "N" number of containers, each having a respective size or shape, where N is a positive integer.

In addition to a magnet, the container 816 can utilize a pad or material that has a high coefficient of friction to reduce movement on an angled or raised shelf 802. In another embodiment, the container 816 can include a sticker or tacky material on the bottom of the container 816.

Figure 14:
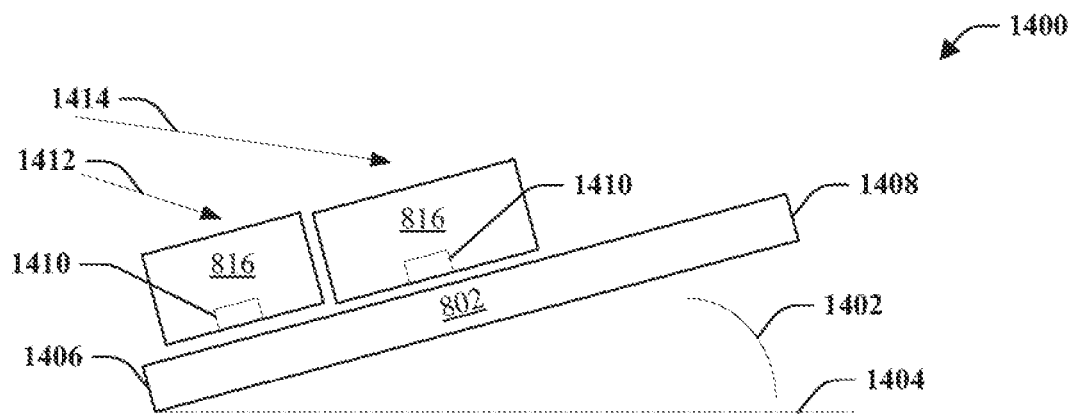
FIG. 14 is an illustration of an embodiment of shelf system for storage container.

Turning to FIG. 14, a cross-sectional view 1400 of the shelf 802 is illustrated. The shelf 802 can have a front side 1406 and a backside 1408, wherein the backside 1408 is higher than the front side 1406 in comparison to a ground level 1404. This configuration of the shelf 802 in FIG. 14 allows for the shelf 802 to have an angle 1402, wherein the angle can be approximately zero (0) degrees to approximately sixty (60) degrees. In an embodiment, the angle 1402 can be nine (9) degrees.

FIG. 14 further illustrates a first container 816 and a second container 816, each having a respective magnet 1410. It is to be appreciated that the containers can be oriented side-by-side or front-to-back (as depicted), or a combination thereof. The angle 1402 allows a first line-of-site 1412 for a camera that captures the removal or return of items housed by each container 816. The angle 1402 further allows a second line-of-site 1414 for a user to view items housed by each container 816.

It is to be appreciated that the height of the shelf 802 can be manually adjusted, automatically adjusted, or a combination thereof. For example, a height of the shelf 802 or angle of the shelf 802 can be adjusted based on a parameter, wherein the parameter is a user, a height of a user, a title of a user, a security clearance of a user, an amount of money dispensed into the storage unit 10, an inventory of an item on a shelf 802, an amount removed of a requested item by a user, a user's historical data related to accessing the storage container 10, and the like. In another embodiment, the angle of the shelf 802 can correspond to an accessibility of items on the shelf 802. For example, a flat or even (compared to ground level) can indicate unrestricted items or items on that flat or even shelf.

In an embodiment, the storage container 10 can identify a user and determine a height of such user. The height of the user can be utilized to adjust a height of the shelf 802 and/or an angle of the camera in order to capture the inside of the storage cabinet 10 without restriction of view. For example, a taller user can have the shelf or shelves 802 be angled with the front side 1406 higher than the backside 1408. In another example, a shorter user can have the shelf or shelves be angled with the front side 1406 lower than the backside 1408. Moreover, based on the height of the user, the camera aim or line-of-site to capture imagery can be adjusted such that a taller user would correspond to an up-angled view from the camera to the inside of the storage cabinet 10 and that a shorter user would correspond to a down-angled view from the camera to the inside of the storage cabinet 10. In another embodiment, an average height of users that can access the storage cabinet 10 can be used as a baseline height for the camera(s) line-of-site and/or the angle 1402 of the shelf or shelves 802, wherein if a user is above the baseline, an adjustment is made for the camera or the shelf.

Figure 15:
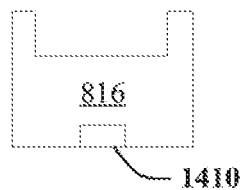
FIG. 15 is a front view of the container having a magnet attached.
Figure 16:
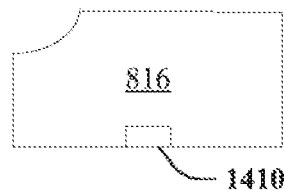
FIG. 16 is a side view of the container having a magnet attached.
Figure 17:
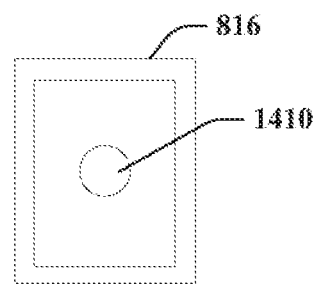
FIG. 17 is a top view of the container having a magnet attached.
Figure 18:
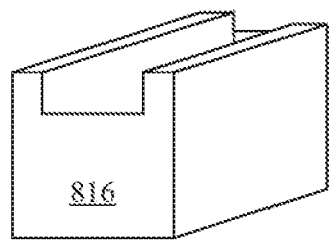
FIG. 18 is a perspective view of the container having a magnet attached.

FIGS. 15-18 illustrate the container 816. The container 816 can house one or more items, wherein the container 816 can be a size, shape, color, or fabricated by a material (e.g., metal, plastic, polymer, alloy, and the like). In a particular embodiment, the container 816 can be fabricated out of a plastic having a bright green tint. FIG. 15 is a front view of the container 816 having a magnet attached. FIG. 16 is a side view of the container 816 having a magnet attached. FIG. 17 is a top view of the container 816 having a magnet attached. FIG. 18 is a perspective view of the container 816 having a magnet attached. It is to be appreciated that the magnet 1410 and/or the container 816 can be any suitable shape or size that holds a volume and can be chosen by sound engineering judgment.

As described above, systems and methods herein include various computer hardware and software aspects. In some embodiments described above, open or closed networks between containers and associated circuits and logic can be used to integrate inventory management end-to-end through business units, locations, or entire enterprises. Information can be aggregated and shared between containers as well. Computers not directly associated with container systems can also be used to access, display, and process information generated from container systems.

In an example, iteration of an inventory activity utilizing such combined hardware and logic, a system begins by authenticating a user, wherein such authentication can be biometric, a password, an ID badge scan, magnetic stripe, barcode, an input from a user, among others. Thereafter, a container of the system can be un-secured to allow access to allow one or more items to be accessed. In embodiments, a barcode scanner is provided to track taking or returning items, and the user scans a barcode on the item to identify such taking or returning. The information gleaned from the barcode scanner can, in some embodiments, be corroborated by information from another sensor (e.g., scale). Alternatively, another sensor can be utilized in place of a barcode scanner. During this time, a video camera can also be recording the activity. The container can be closed and re-secured after the desired items are removed and accounted for. After the transaction is complete, or at regular intervals, information can be retrieved from the system. Retrieval of information can be performed locally or remotely, and automatically or manually with human interaction. This information can be stored in a database facilitating review and management of inventory information. The database can be leveraged by administrators and managers, as well as, supply personnel who can use system information to replenish inventory and forecast demand. Notifications can be generated and transmitted to ensure the appropriate personnel are aware when action is required (e.g., inventory low, specific item taken, fraud or abuse). The information can be, but is not limited to, information of frequency of use of the item, number of items taken, number of items returned, information related to a condition of the item, a record of who is taking an item, a record of who is returning an item, a record of a duration of time the item was used, tracking of a job the item was used, among others. Information may be connected to various outside systems for replenishment, asset tracking, reporting among others.

Turning back to FIG. 2, the storage container 10 is illustrated. In an embodiment, at least one of the first door or the second door can be coupled with at least one door extension arm 11 that includes a first end and a second end opposite thereto. The door extension arm 11 can further include means to provide a force to open and/or close the door without users input or effort. The door extension arm 11 can be attached at a top of the door, a bottom of the door, or a combination thereof. The other end of the door extension arm 11 can be secured to a point located on the frame or structure of the storage container. The door extension arm 11 biases the door towards an open position. In another embodiment, the door extension arm 11 can be used to bias the door towards a closed position. Moreover, a first pair of door extension arms can be used on a first door (e.g., located at the top and bottom of the first door) and a second pair of door extension arms can be used on a second door (e.g., located at the top and bottom of the second door).

By way of example, if a door extension arm 11 is coupled to the second door, the first door secures the second door shut when the doors are in a closed position. When a user opens the first door, the door extension arm 11 imposes an outward force, causing the second door to open automatically. Door extension arm 11 can comprise at least one of a spring, a pneumatic piston, a hydraulic piston, or a combination thereof to provide a force to open and/or close the door.

With further reference to FIG. 2, cameras 14 may also exist on any exterior surface of the storage container 10. A camera 14 may be mounted on either side or the back of the storage container 10. This placement of the camera 14 allows for viewing or surveillance of the immediate area surrounding the storage container 10 and can view any person or thing approaching the storage container 10 regardless of what direction the person or thing comes from.

Turning back to FIG. 5, the storage container 10 is illustrated with additional features and embodiments. The storage container 10 further comprises an air purifying and/or filtration system 19 (further referred to as "air purifying system") that is configured to receive air from inside the storage container 10 and filter this air with an air filter and pump the filtered air to the inside of the storage container 10. It is to be appreciated that the air purifying system 19 can be located within the storage container 10, outside the storage container 10, or a combination thereof. Air purifying system 19, for example, can utilize an air pump and a filter. By way of example and not limitation, the filter can be a high efficiency particulate air (HEPA) filter, ionic air filter, activated carbon filter, Ultraviolet (UV) light air filter, among others. Air purifying system 19 can maintain the interior of the storage container 10 free from excess dust, particulates, odors, or fumes with the circulation of air inside via the pump and the filter.

Referring back to FIG. 8, the storage container 10 is illustrated and can be supported by one or more adjustable feet 818 wherein the vertical position of each of the four adjustable feet 818 is individually adjustable to account for uneven floors or surfaces. Adjustable foot 818 can include a base portion and a shaft portion. The base portion can be any shape, including circular, polygon-shaped, triangle-shaped, or square-shaped, and is in contact with the ground or surface the storage container 10 is situated. The shaft portion is attached to the base portion on one end and is engaged with the bottom surface or frame of storage container 10 on its other end. In an embodiment, the shaft portion is threaded and is vertically adjustable by way of rotating the shaft portion. In certain embodiments, an adjustable foot 818 can be engaged with the storage container 10 at each of the storage container's 10 four bottom corners. Vertically adjusting an individual adjustable foot 818 can cause the respective corner of the storage container 10 to be raised or lowered. In this manner, the storage container 10 may be leveled or tilted by way of raising or lowering the adjustable feet 818 as desired. It is to be appreciated that the adjustable feet 818 can be located on the corners, the perimeter of the base, within the middle of the base, or any other location that can be beneficial to ensure the storage container is level. In another embodiment, a customizable system for the adjustable feet 818 can be employed with the storage container 10 such that a user can place the adjustable feet on the base of the storage unit at user-defined locations. Such feet can be attached to caster type wheels or be installed by themselves in addition to wheels, or without wheels altogether.

As further seen in FIG. 8, a customizable partition system is illustrated. The customizable partition system can include partitions within or on each shelf 802. The customizable partition system can include a first partition 820 and/or a second partition 822, wherein each can be arranged within the storage container 10 to create one or more compartments on the shelf 802. It is to be appreciated that the first partition 820 and the second partition 822 can be used together or independently. First partition 820 comprises a magnetic base portion 821. In other embodiments, the first partition's base portion 821 may comprise other means of attachment such as hook-and-loop connectors (e.g. Velcro), adhesive, screw attachments, suction cups, mounting hooks/loops, among others. The magnetic base portion 821 removeably attaches flush with the inside surface of the back wall 804 of the storage container 10. A divider member 823 can extend perpendicular to the magnetic base portion 821. In an embodiment, the divider member 823 extends from a center of the magnetic base portion 821, creating a "T" shaped partition. Second partition 822 comprises a magnetic base portion 824. In other embodiments, the second partition's base portion 824 may comprise other means of attachment such as hook-and-loop connectors (e.g. Velcro), adhesive, screw attachments, suction cups, mounting hooks/loops, among others. The magnetic base portion 824 removeably attaches flush with an inside surface of either the first side wall 806 or second side wall 808. A barrier member 825 extends perpendicular to the magnetic base portion 824. In an embodiment, the barrier member 825 extends from one end of the magnetic base portion 825, creating an "L" shaped partition.

The first partition 820 and second partition 822 can be arranged or positioned in such a manner that the divider member 823 of the first partition 820 and the barrier member 825 of the second partition 822 meet perpendicularly to form a compartment on the shelf 802 with the first partition 820 forming a side of the compartment and the second partition 822 forming a front end of the compartment. In embodiments, multiple first partitions 820 and multiple second partitions 822 are arranged to create a plurality of compartments within the interior of the storage container 10 on the shelf 802 or on a plurality of shelves 802.

Figure 19:
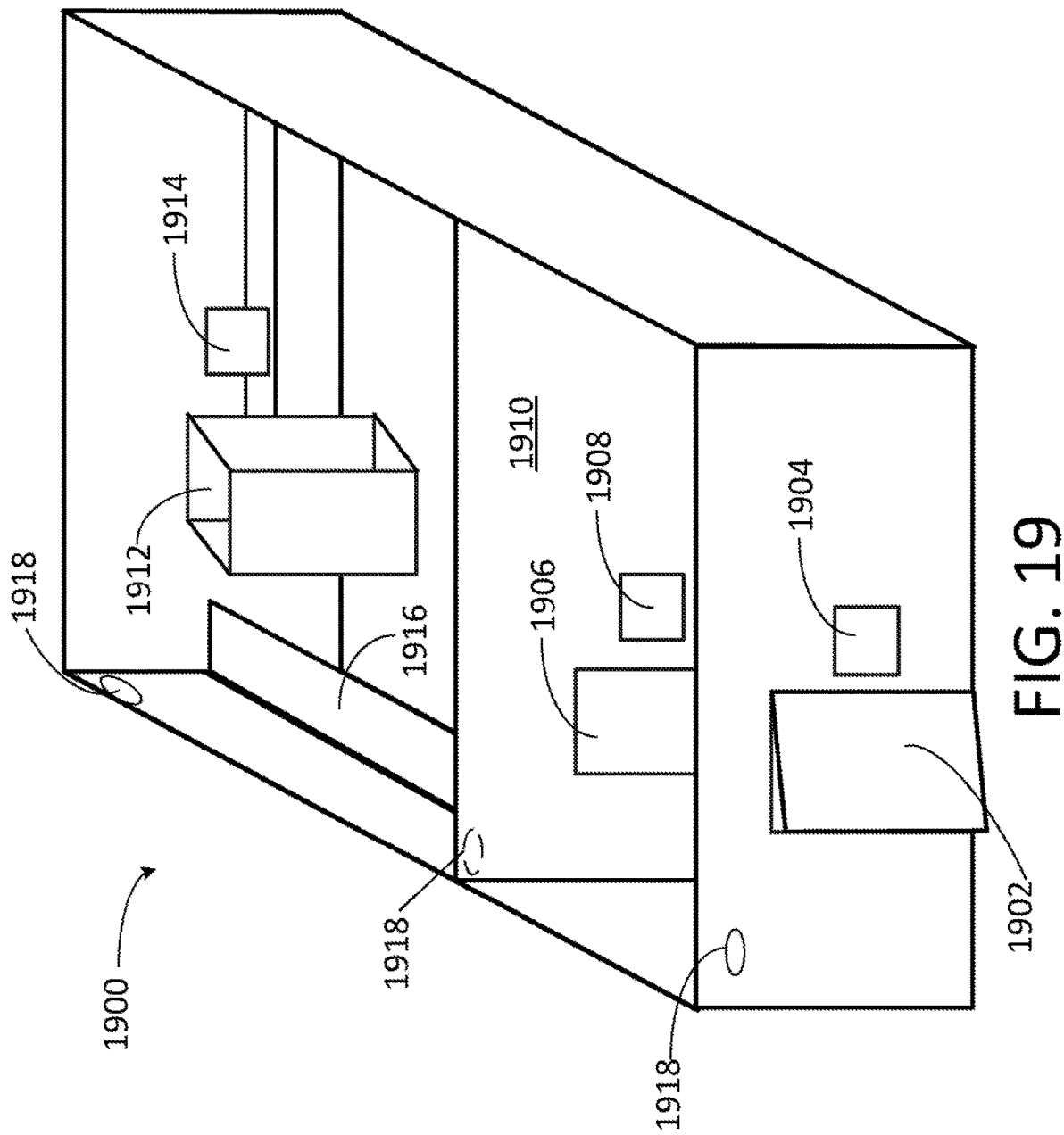
FIG. 19 is a perspective view of an embodiment of the shipping container.

FIG. 19 shows a perspective view of an embodiment of an inventory system 1900. The inventory system 1900 can be used with a shipping container, a storage room, a truck trailer, a storage unit, a room rented to store items, a barn, a shed, a tent, a garage, a mobile home, a truck body, among others. The system 1900 can be employed with a shipping container that is removeably coupled to a truck trailer or semi. For instance a truck trailer system can include a vehicle and a removable trailer. In certain embodiments, the removable trailer can be attached and transported via either a truck or a train. The removable trailer or storage room can have a double-door on an end that allows access to an interior. Often, the removable trailer can be transported to a location. The removable trailer can be placed in any suitable location such as personal property or land, ships, drilling rigs, vehicles, hospitals, schools, retail stores, construction sites, mines, among others. This removable trailer can be adapted to become an inventory system 1900. It is to be appreciated that a type of a removable trailer can be a shipping container. The inventory system 1900 is illustrated in FIG. 19 as a shipping container but it is to be appreciated that any suitable room or trailer or compartment can be utilized with the subject innovation. For the below description and ease of readability, a shipping container 1900 is described. The shipping container 1900 encloses an interior. Shipping container 1900 can be any size that accommodates the entry of a user as well as providing space for storing items. For example, the shipping container 1900 can have a width corresponding to a trailer or truck. For example, the shipping container can have a width of 8 feet, 9 inches which corresponds to a standard truck width. The length of the shipping container 1900 can vary as well. For example, the shipping container 1900 can be a 52 foot-long trailer or a 10 foot, 20 foot, or 40 foot-long container.

Shipping container 1900 can have a first entry door 1902 that provides access to a security barrier 1910 within the interior of the shipping container 1900. In an embodiment, an external verification component 1904 can be located adjacent to the first entry door 1902. The external verification component 1904 is configured to receive a portion of data from a user as input to determine whether the user is allowed access to the shipping container 1900 through the first entry door 1902. First entry door 1902 can have a locking component. In an embodiment, the locking component is magnetically actuated. In other embodiments, the locking component is a mechanical lock and/or a latch system that can receive a padlock. External verification component 1904 deactivates first entry door's 1902 locking component upon proper user verification. In the embodiment of the shipping container 1900 being a removable trailer for a truck, the first entry door 1902 can be double-doors that are latched and secured with a padlock, wherein the external verification component 1904 is not used.

Security barrier 1910 can include a second entry door 1906. The second entry door 1906 can provide a user access to a secure room upon proper user verification or validation. It is to be appreciated that the second entry door 1906 can include additional security features to gain access in comparison to the first entry door 1902. For example, the first entry door 1902 can include a latch and padlock for security measures, wherein the second entry door 1906 can include internal verification component 1908 in addition to a locking component (e.g., padlock or magnetic lock). By way of example, the security barrier 1910 can be a metal fence that is adjustable in width and height to account for a size of the shipping container 1900 dimensions. In certain embodiments, security barrier 1910 can be a solid wall. The security barrier 1910 can be adjustable to accommodate shipping containers of various widths or sizes. For example, the security barrier can have detachable extension pieces that can be added or removed, or it may consist of telescoping parts that can be extended or contracted to fit the width of the shipping container 1900.

In an embodiment, an internal verification component 1908 can be located on the security barrier 1910 adjacent to the second entry door 1906. The internal verification component 1908 is configured to receive a portion of data from a user as input to determine whether the user is allowed access to the secure room through the second entry door 1906. The data received from the user can be data from a security badge, a lanyard, a code, a PIN, an employee number, a combination of digits or letters, a user name, among others. Second entry door 1906 can have a locking component. In an embodiment, the locking component is magnetically actuated. In other embodiments, the locking component is a mechanical lock. Internal verification component 1908 deactivates second entry door's 1906 locking component upon proper user verification, providing the user access to the secure room. In some embodiments, an exit button exists inside of the secure room. When a user activates the exit button, the second entry door's 1906 locking component disengages, allowing the user to exit the secure room through the second entry door 1906. In further embodiments, another exit button may be used in a similar fashion to disengage the first entry door's 1902 locking mechanism in order to allow the user to exit through the first entry door 1902 in order to allow exit in case of an emergency.

The inventory system 1900 can house various shelving 1916. The shelving can hold one or more items 1914. The inventory system 1900 can also include a control enclosure 1912 which comprises a controller component 15. In an embodiment, the inventory system 1900 can also house a scanning device 16 which may be removeably docked on top of or inside of the control enclosure 1912. In some embodiments, a command sheet is housed within the inventory system 1900. A user can utilize the scanning device 16 to scan a barcode or an indicia on the command sheet to provide instructions to the controller component 15. For example, a user can scan a bar code printed on the command sheet that instructs the controller component 15 to undo the last scan or action. As another example, a user can scan a bar code printed on the command sheet to notify the controller component 15 that the next scan input represents an item that is going to be accessed, borrowed, or taken.

The inventory system 1900 can also comprise a camera system having one or more cameras 1918. In certain embodiments, a camera 1918 can be mounted on an exterior wall of the shipping container 1900. The camera 1918 can be mounted in such a way to focus and record an image of a user approaching or standing at the first entry door 1902. A camera 1918 may also be located within the first entry door 1902, but in front of the security barrier 1910. This camera 1918 can be mounted in such a way to focus and record an image of a user standing at the second entry door 1906. In further embodiments, cameras 1918 can be mounted inside of the secure room. For example, any number of cameras 1918 can be mounted on any of the interior walls of the secure room or mounted in any of the four corners of the secure room. A digital video recorder system can be used to keep records of the camera footage. This system can allow a user or administrator to view camera footage that is stored on a computer hard drive. This digital video recorder system and hard drive can be located within the shipping container 1900 or they can be located external to the shipping container 1900.

With further reference to FIG. 19, cameras 1918 may also exist on any exterior surface of the shipping container 1900. A camera 1918 may be mounted on either side or the back of the shipping container 1900. This placement of the camera 1918 allows for viewing or surveillance of the immediate area surrounding the shipping container 1900 and can view any person, vehicle, object, or large products approaching the shipping container 1900 regardless of what direction the person or thing comes from.

Figure 20:
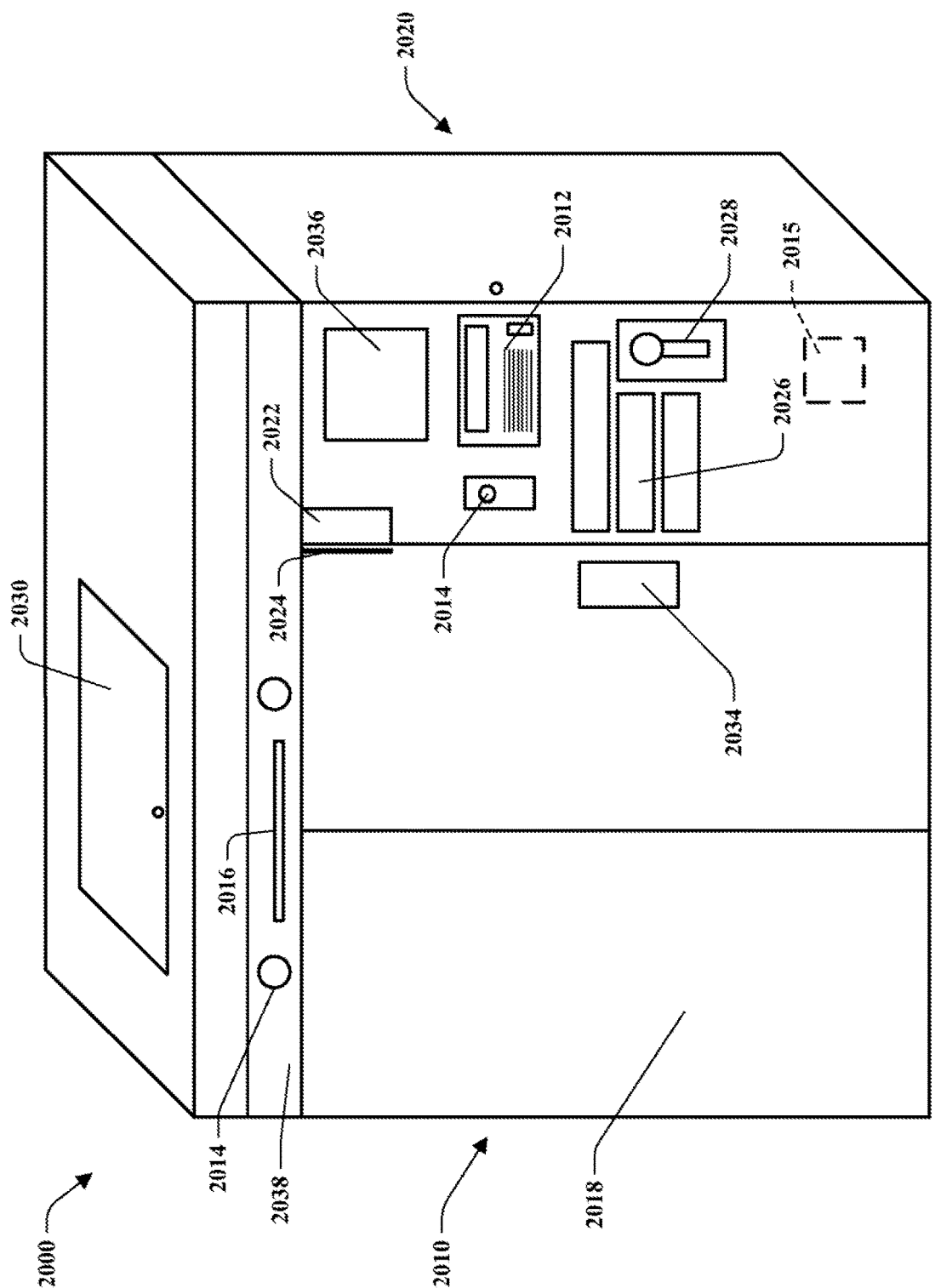
FIG. 20 is a perspective view of an embodiment of a flame retardant cabinet with control bay.

FIGS. 20 and 21 show a perspective view of an embodiment of flame retardant storage cabinet 2000 that includes an inventory management system. The flame retardant storage cabinet 2000 includes a storage compartment 2010, a control bay 2020, and a camera bay 2038. In an embodiment, the storage compartment 2010 and the control bay 2020 are located side-by-side, and the camera bay 2038 is located overhead, above the storage compartment 2010 and the control bay 2020. It should be appreciated that different arrangements are possible such as the camera bay 2038 being arranged on the side of the storage compartment 2010 or the control bay 2020. Other arrangements can include the control bay 2020 being mounted above the storage compartment 2010 or below the storage compartment 2010. It should be appreciated that in certain embodiments, the flame retardant storage cabinet 2000 can include each of the storage compartment 2010, the control bay 2020, and the camera bay 2038, or it can include a subset of the compartments. In certain embodiments, the flame retardant storage cabinet 2000 can have cutouts configured to receive the forks of a forklift to enable forklift lifting of the flame retardant storage cabinet 2000.

Storage compartment 2010 can be a flame retardant cabinet designed to store flammable items such as paint, ink, chemicals, or any other flammable material. The storage compartment 2010 can protect its contents from excessive heat or sources of ignition. In certain embodiments, the storage compartment 2010 is defined by flame retardant and/or blast proof walls, ceiling, floor, and a door in such a manner that isolates the storage compartment 2010 from the control bay 2020, camera bay 2038, or any other compartment that may contain electronics, wires, or any electrical components. Isolating the storage compartment 2010 from electrical components eliminates the possibility of an electrical component acting as an ignition source. For example, when the storage compartment 2010 is isolated from the control bay 2020 and the camera bay 2038, any flammable components or flammable vapors released therefrom will be prevented from igniting in a situation where an electrical component located in the control bay 2020 or the camera bay 2038 sparks, arcs, overheats, or catches fire.

Storage compartment 2010 includes at least one door 2018. The door 2018 can be a folding door (bi-fold, tri-fold, etc.), a swinging door, an overhead garage-style door, double doors, among others. The door 2018 can include a handle 2034 and can be configured to open in any direction. As shown in FIG. 20, a door magnet 2024 can be mounted to the door 2018. The door magnet 2024 interacts with a locking mechanism 2022 in the control bay 2020 to provide lock/unlock functionality, as explained below in further detail. Door 2018 can be opened or closed manually, or it can be opened or closed remotely by an administrator. Remote operation can cause the door 2018 to operate by way of a hydraulic door control, an electric motor controller, or any other means of actuating door movement.

Storage compartment 2010 can include one or more shelves 2002 arranged within the interior of the storage compartment 2010 to allow placement and organization of one or more items. The shelves 2002 can be spill-proof, meaning that the shelves 2002 are designed to contain a liquid from leaking or spilling onto another shelf beneath. For example, the spill-proof shelf 2002 can have a lip or rim along the front edge of the shelf 2002 so that if a container placed on a shelf 2002 leaks liquid, the spill-proof shelf 2002 contains the liquid so that the liquid does not drip, leak, or fall on shelves below. In certain embodiments, bins can be placed on the shelves 2002. These bins can hold smaller objects (e.g. batteries, screws, hardware, etc.). The bins can be constructed from a material chosen using sound engineering judgment. In certain embodiments, the bin material is a material that resists corrosion. In certain embodiments, product dividers can be placed on the shelves 2002 to aid organization and segregation of such products. Storage compartment 2010 can also include folder slots on its interior side walls to hold packets that may contain paperwork. Such paperwork can include instruction manuals, data sheets about the contents of the flame retardant storage cabinet, or any other informational materials.

Each item placed within storage compartment 2010 can have a barcode or other indicia printed or affixed to the item. This allows a user to scan the barcode or indicia with a scanning device in order to notify the inventory management system which item is being taken or returned. In another example, a passive radio frequency identification (RFID) label and/or tag can be affixed to the item and such RFID label can be read by one or more radio frequency identification (RFID) scanners 2062 such as an RFID antenna mounted on the storage compartment 2010 or control bay 2020 to record item being taken or returned, as described in greater detail below in reference to FIG. 21B. Storage compartment 2010 can also include a ventilation system, flame suppression system, one or more heat sensors, and/or temperature monitors.

The control bay 2020 can be mounted to the storage compartment 2010 in such a way as to not disturb the flame retardant characteristic or rating of the storage compartment. Control bay 2020 can include a display component 2036, a verification component 2012, a badge reader 2028, a camera 2014, graphic strips 2026, and a locking mechanism 2022. Control bay 2020 also includes a controller component 2015 to read inputs from the system such as data from the cameras 2014, scanning device, heat sensors, flame suppression system, or temperature monitors. Controller component 2015 can output various alarms, alerts, or notifications to the display component 2036 or to a remote administrator, based on the various inputs from system components or sensors.

Controller component 2015 also controls access to the storage compartment 2010 by way of the locking mechanism 2022. In certain embodiments, the locking mechanism 2022 is a locking magnet. In these embodiments, the locking mechanism 2022 is normally energized to provide an attracting magnetic force on the door magnet 2024 to keep the door 2018 locked in a closed position as shown in FIG. 20. Upon valid user identification via the verification component 2012 and/or the badge reader 2028, the locking mechanism 2022 is de-energized, releasing the magnetic force from the door magnet 2024, and allowing the door 2018 to be opened.

Figure 21A:
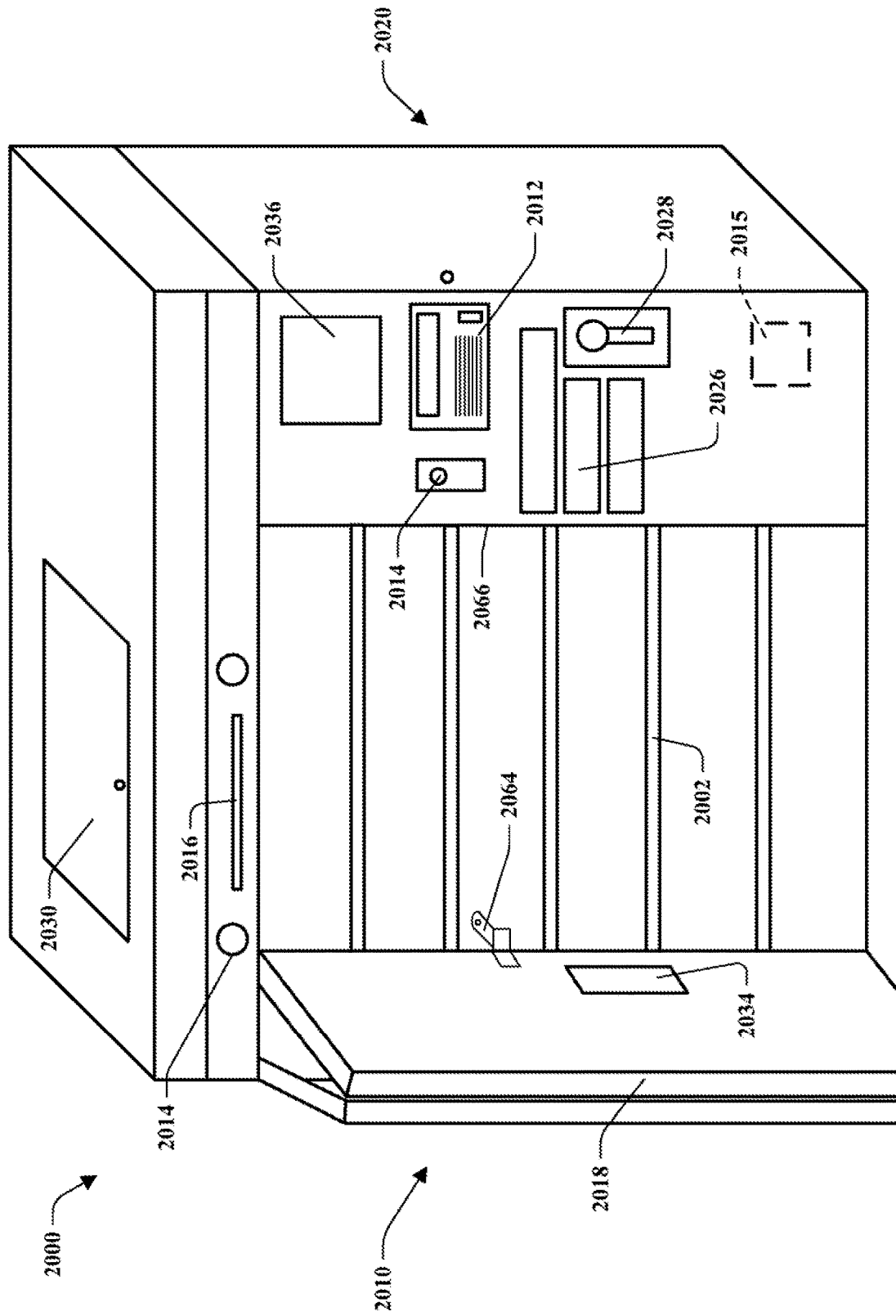
FIG. 21A is a perspective view of an embodiment of the flame retardant cabinet with control bay.
Figure 21B:
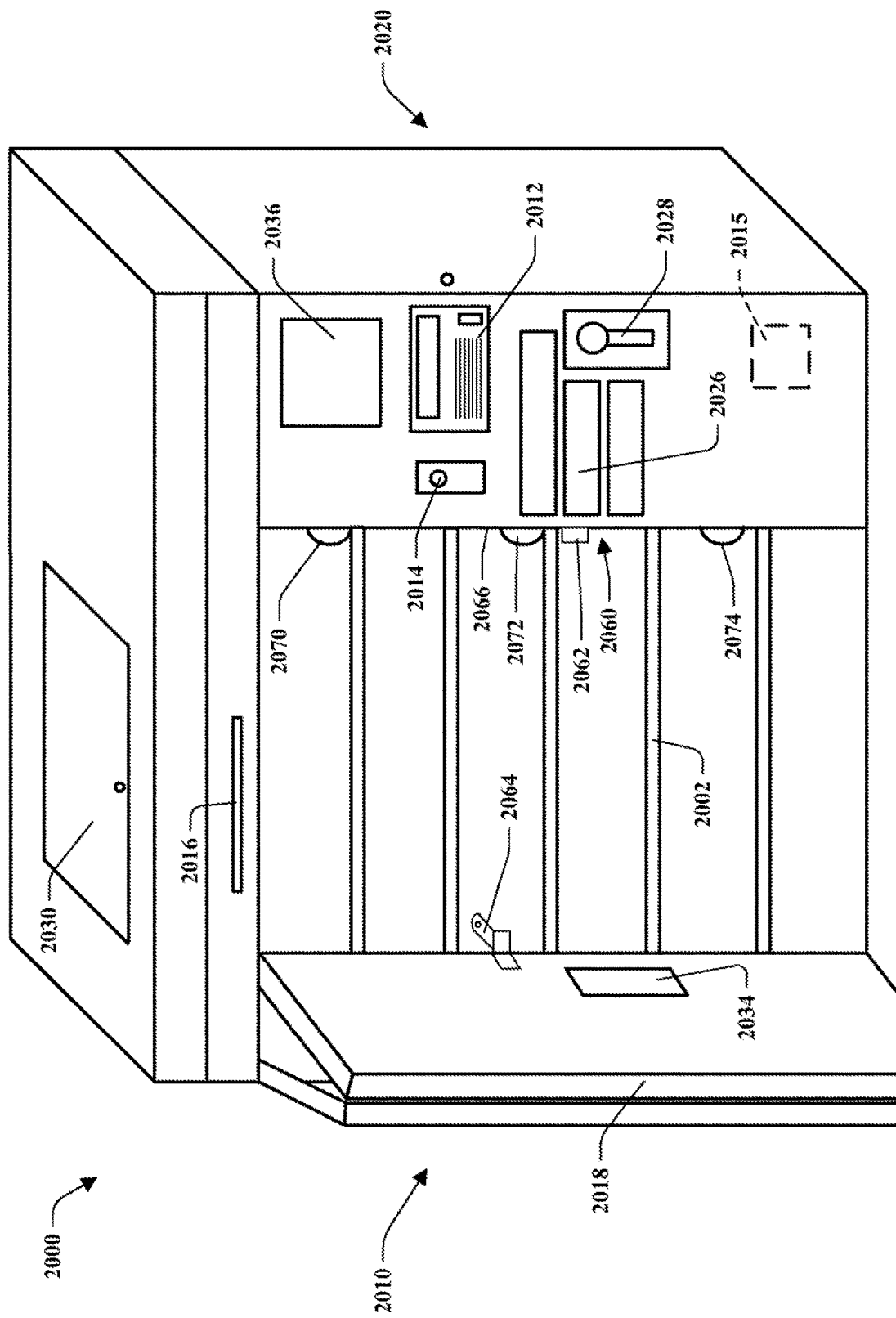
FIG. 21B is a perspective view of an embodiment of the flame retardant cabinet with control bay.

As shown in FIGS. 21A and 21B, certain embodiments of the flame retardant storage cabinet 2000 can include a door latch 2064 that takes the form of a strike piece or a lock bar configured to be inserted into a lock slot 2066 when the door 2018 is closed. In certain embodiments, the locking mechanism 2022 can include an actuator and a locking bolt that is operated by the actuator. In certain embodiments, the actuator can be a magnetic actuator. Locking mechanism 2022 can be located within the control bay 2020. As shown with regards to FIG. 22B, the locking mechanism 2022 can include a locking magnet. When the door 2018 is in the closed position and the door latch 2064 is inserted into the slot 2066, the locking magnet in the locking mechanism 2022 can be activated to exert a magnetic force on the door latch 2064 to hold the door 2018 in a closed position. In other embodiments, locking mechanism 2022 can include an actuator and a locking pin or locking bolt. The actuator in the locking mechanism 2022 can actuate the locking pin or a locking bolt that is part of the magnetic locking mechanism 2022, and located inside the control bay. When actuated, the locking pin or locking bolt inserts into a hole in the door latch 2064 to hold the door 2018 in a closed position. Including the locking mechanism 2022 within the control bay 2020 allows for locking functionality while electrically isolating the interior of the storage compartment 2010 from the control bay 2020.

Display component 2036 can be mounted on any outward facing surface of the control bay 2020 and can display any information, including information related to the flame retardant storage cabinet 2000, its inventory, users, and other containers. In embodiments, the display component 2036 can display the inventory contained in summary form or item-by-item. In some embodiments, display component 2036 can display a status of the flame retardant storage cabinet 2000 related to its function (e.g., offline or requiring service) or its inventory (e.g., items checked out or exhausted). In the event that flame retardant storage cabinet 2000 requires service (e.g., damaged, inventory requiring replenishment), display component 2036 can display the location of nearby containers with one or more desired inventory items. Display component 2036 can be coupled with one or more other components (e.g., processors, memory) to receive data related to the information presented on display component 2036. In certain embodiments, display component 2036 can display instructional videos intended to teach a user how to use the flame retardant storage cabinet 2000 or an inventory management system corresponding with the flame retardant storage cabinet 2000. In further embodiments, the display component 2036 can display data corresponding to items within the storage compartment 2010. Such data can include, for example, descriptions of the items or material safety data information pertaining to the items.

In alternative or complementary embodiments, display component 2036 can display information about an inventory item, user, or group of users. For example, inventory information can include information about an inventory item, its cost, its expected lifespan or usage, and others. In embodiments, a user's inventory usage can be displayed, such as the number or value of items utilized. In embodiments, display component 2036 can facilitate an account system where credits or debits are tracked by user. In particular embodiments, the user can be given an inventory "allowance" where they will be prevented from accessing additional inventory items after debits exceed a threshold. Finally, users or groups of users can be displayed on display component 2036 in terms of their total usage or efficiency, or comparative usage or efficiency in view of other users or groups.

The control bay 2020 further includes a verification component 2012 and a badge or fob reader 2028. The verification component 2012 is configured to receive a portion of data from a user as input to determine whether the user is allowed access to the storage compartment 2010 and/or inside of the storage compartment 2010 that houses items. The verification component 2012 functions similarly to other embodiments previously disclosed herein. The badge reader 2028 can scan a user's badge to identify the user, and may be integrated into the verification component 2012 or can be a separate device.

The control bay 2020 can further include a camera 2014. This camera 2014 can be positioned in such a way to record the face of a user as he or she is attempting to access the storage compartment 2010. The camera 2014 can be a wide lens camera that can obtain a wide-angle view of the flame retardant storage cabinet 2000 surroundings.

Graphics strips 2026 can be included on an outside surface of the flame retardant storage cabinet 2000. In an embodiment, the graphic strips 2026 are located on the front of the control bay 2020. The graphic strips 2026 can include images of barcodes or other indicia. A user can utilize a scanning device associated with the inventory management system of the flame retardant storage cabinet 2000 to scan a barcode or an indicia on the graphic strips to provide instructions to the controller component 2015. For example, a user can scan a bar code printed on the graphic strips to instruct the controller component 2015 to undo the last scan or action. As another example, a user can scan a bar code printed on the graphic strips to notify the controller component 2015 that the next scan input represents an item that is going to be accessed, borrowed, taken, or returned to the storage compartment 2010. Graphic strips 2026 can also be located on the shelves 2002. For example, an image of a barcode or other indicia corresponding to an item on a shelf 2002 can be located on the shelf 2002 under or above the item. When a user removes an item or returns an item, the user can scan the bar code printed on the graphic strip to notify the controller component 2015 that the user has removed or returned that item.

Camera bay 2038 can include at least one camera 2014 and a light 2016. The camera 2014 can be a wide lens camera to provide a wide-angle view of the flame retardant storage cabinet 2000 surroundings. The light 2016 can be placed and configured to illuminate the area immediately in front of the flame retardant storage cabinet 2000 and/or the inside of the storage compartment 2010. The camera 2014 and/or light 2016 can be motion activated, or activated by a user's interaction with a component of the control bay 2020. In some embodiments, an access door 2030 is located on top of the camera bay 2038 to provide access to the internal wiring and components of the camera 2014 and the light 2016. The camera bay 2038 can also provide a route for wiring from the camera 2014, light 2016, or sensors located in the storage compartment 2010 to run to the control bay 2020. This feature minimizes or eliminates the number of holes needed to run wires into and out of the storage compartment 2010, thus preserving the storage compartment's 2010 flame retardant characteristics and ratings.

Turning now to FIG. 21B, certain embodiments can include the at least one camera 2070, 2072, 2074 on a sidewall 2060 of the control bay 2020, oriented so that the cameras 2070, 2072, 2074 have a field of view that includes at least one of the shelves 2002. in certain embodiments, the flame retardant storage cabinet 2000 can include a plurality of cameras 2070, 2072, 2074 arranged vertically on the sidewall 2060 of the control bay 2020 such that each of the plurality of cameras 2070, 2072, 2074 has a field of view that includes at least one respective shelf 2002 of a plurality of shelves. Cameras 2070, 2072, 2074 can view and monitor objects as they are removed from the cabinet in order to retain a record of what item is removed from the storage. Cameras 2070, 2072, 2074 located on the sidewall 2060 of the control bay 2020 can be located either inside of the door 2018 when closed, or on the outside of the door 2018 when closed. In certain embodiments, cameras 2070, 2072, 2074 are always active and recording. In other embodiments, the cameras 2070, 2072, 2074 are placed into a sleep mode when the door 2018 is closed, and are activated upon a user opening the door 2018.

In certain embodiments, one or more radio frequency identification (RFID) scanners 2062 can be located adjacent to the front opening of the storage compartment 2010 such that the RFID scanners 2062 can read RFID tags affixed to items as they are being removed or placed into the storage compartment 2010. For example, RFID scanners 2062 can be mounted on either sidewall 2060 around the opening of the storage compartment 2010, the bottom of the storage compartment 2010 opening, the top of the storage compartment 2010 opening, or on a surface of the door 2018. The RFID scanners 2062 can communicate with the inventory management system by, for example, communicating with the controller component 15. In an example, a user may remove an item from the storage compartment 2010. The item can have an RFID tag associated with the item affixed to the item. As the user removes the item from the storage compartment 2010, the one or more RFID scanners 2062 detects the item's RFID tag. Upon detection of the RFID tag, the inventory management system detects and records that the item has been removed from the storage compartment 2010. When the user replaces the item into the storage compartment 2010, the one or more RFID scanners 2062 detects the item's RFID tag. Upon detection of the RFID tag, the inventory management system detects and records that the item has been placed into the storage compartment 2010.

Figure 22A:
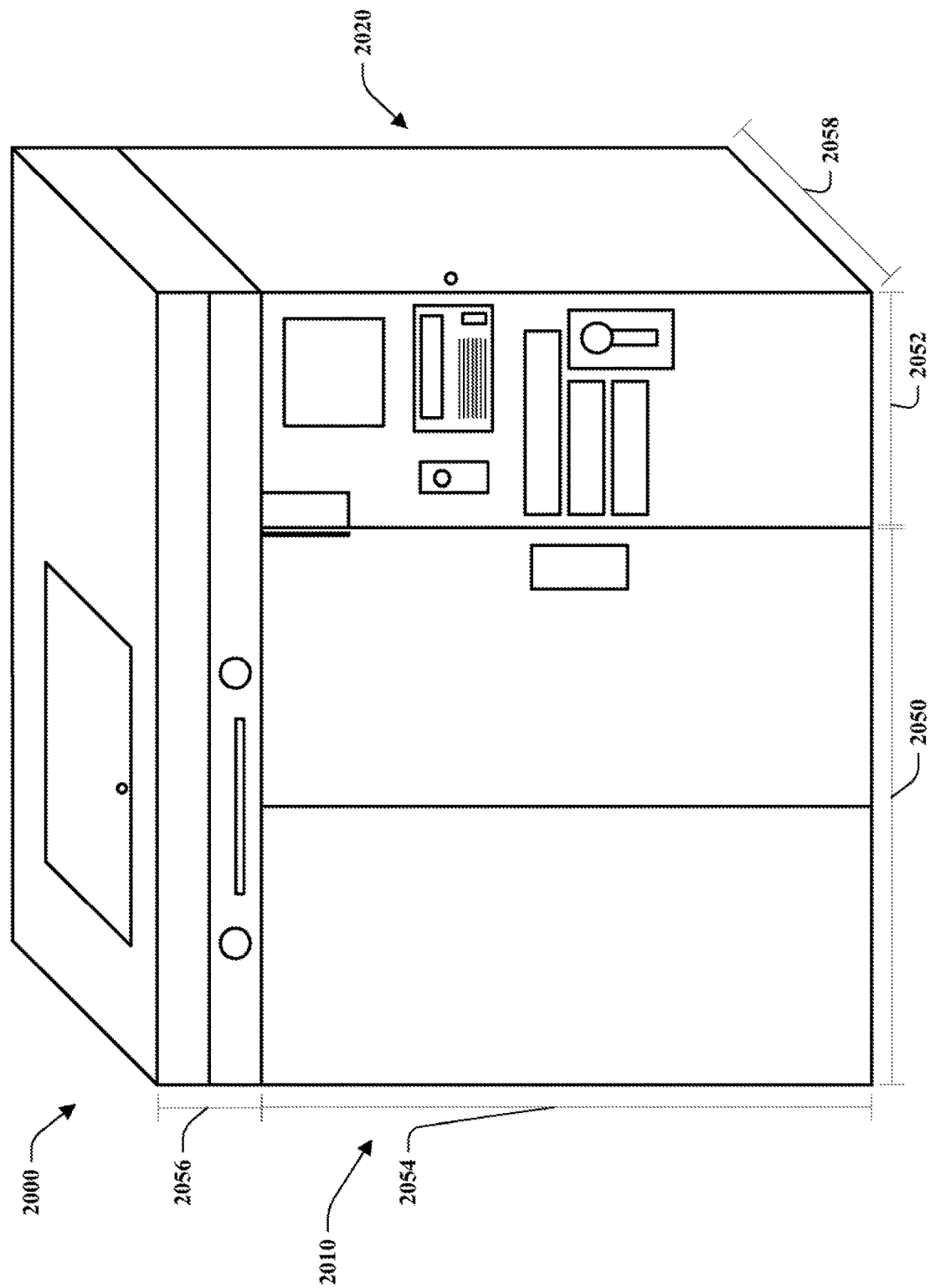
FIG. 22A is a perspective view of an embodiment of the flame retardant cabinet with control bay.

As displayed in FIG. 22A, the storage compartment 2010 can have a width 2050 from one end of the storage compartment 2010 to the opposite end of the storage compartment 2010. The control bay 2020 can have a width 2052 from one end of the control bay 2020 to the opposite end of the control bay 2020. The flame retardant storage cabinet 2000 can have a first height 2054 from the base of the flame retardant storage cabinet 2000 to the bottom of the camera bay 2038, and a second height 2056 from the bottom of the camera bay 2038 to the top of the flame retardant storage cabinet 2000. The flame retardant storage cabinet 2000 can have a depth 2058 from the front of the flame retardant storage cabinet 2000 to the back surface. The flame retardant storage cabinet 2000 can be fabricated from at least one of a metal, a plastic, a polymer, or a composite material. Yet, it is to be appreciated that the flame retardant storage cabinet 2000 shape, materials, composition, or size can be chosen with sound engineering judgment without departing from the intended scope of coverage of the embodiments of the subject invention.

By way of example and not limitation, the flame retardant storage cabinet 2000 can have the following dimension: the storage compartment width 2050 can be approximately 43 inches; the control bay width 2052 can be approximately 16 inches; the first height 2054 can be approximately 65 inches; the second height 2056 can be approximately 4 inches; and the depth 2058 can be approximately 18 inches. Yet, it is to be appreciated that the flame retardant storage cabinet 2000 size and components thereof can be chosen with sound engineering judgment without departing from the intended scope of coverage of the embodiments of the subject invention.

Figure 22B:
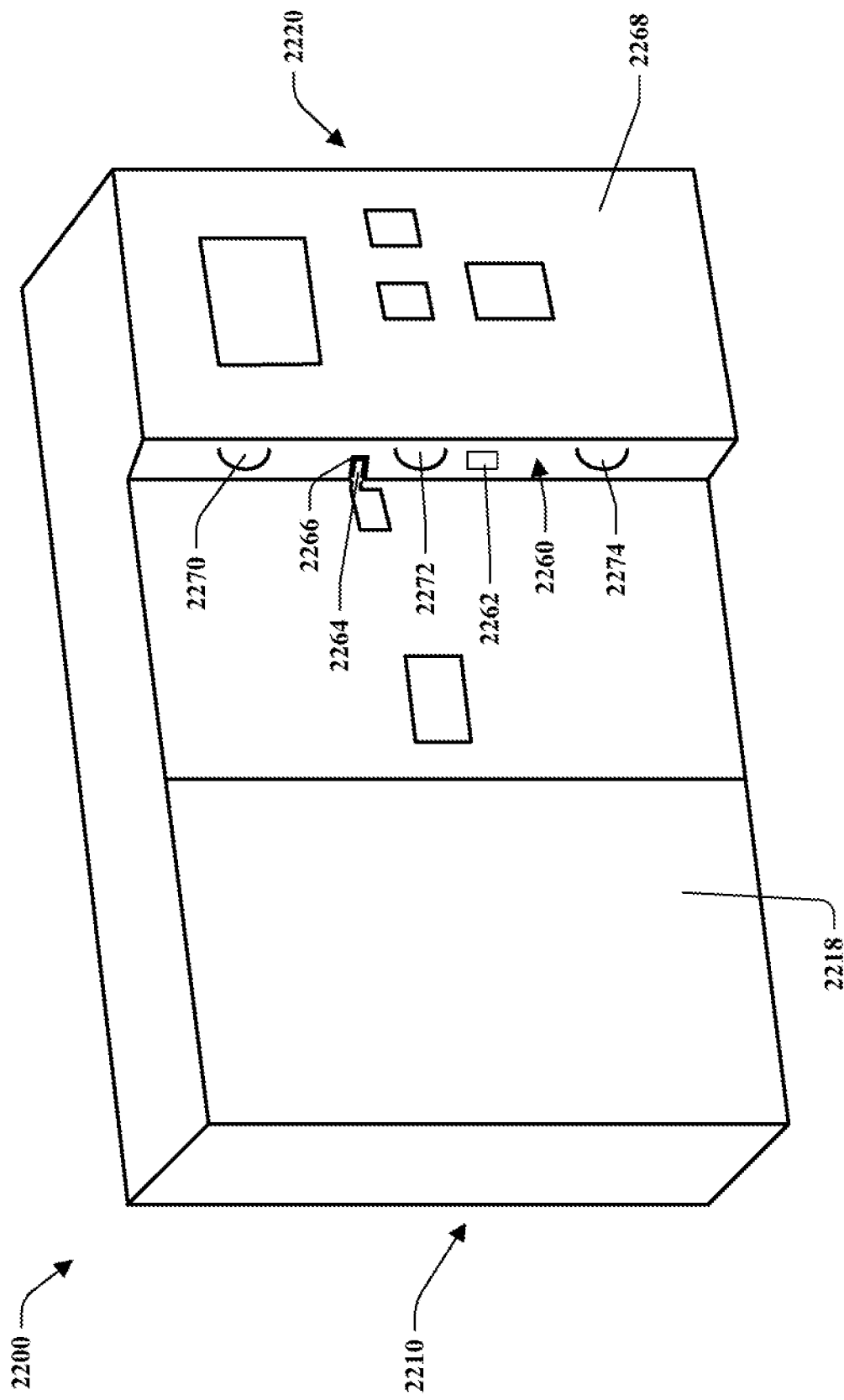
FIG. 22B is a perspective view of an embodiment of the flame retardant cabinet with control bay.

Turning now to FIG. 22B, another embodiment of the flame retardant storage cabinet 2200 can include any of the components and functionality described above, but it can have a control bay 2220 that is deeper than the storage compartment 2210. In this embodiment, a front face 2268 of the control bay 2220 can extend outward in front of the storage compartment 2210 and the door 2218. Side wall 2260 extends outwards from the storage compartment 2210 to the front face 2268 of the control bay 2220. One or more cameras 2270, 2272, 2274 can be mounted on the sidewall 2260 and placed so that the cameras 2270, 2272, 2274 can view the items stored within the storage compartment 2210 while the door 2218 is opened. For example, a first camera 2270 can be located on the sidewall 2260 to view at least a first shelf inside the storage compartment 2210, a second camera 2272 can be located on the sidewall 2260 beneath the first camera 2270 so that the second camera 2272 can view at least a second shelf located below the first shelf inside the storage compartment 2210, and a third camera 2274 can be located on the sidewall 2260 beneath the second camera 2272 so that the third camera 2274 can view at least a third shelf located below the second shelf inside the storage compartment 2210. In certain embodiments, one or more RFID readers 2262 can also be mounted on the sidewall 2260. As previously described, when the door 2218 is closed, a door latch 2264 can be inserted into a corresponding slot 2266 located on the sidewall 2260. When the door latch 2264 is inserted into the slot 2266, the locking mechanism 2022 located within the control bay 2220 can activate to lock the door. The locking mechanism 2022 can lock the door by either applying a magnetic force directly to the door latch 2264, or it can actuate a pin or a bolt located within the control bay 2220 to insert into a hole in the door latch 2264, securing the door 2218 shut in place.

Turning now to FIG. 23, a camera unit 2300 can be mounted to an outside surface of a cabinet or container. The camera unit 2300 includes a camera 2302 attached to the end of an articulating arm 2304. The camera unit 2300 can be controlled remotely by an administrator. The camera unit 2300 can have up to six degrees of freedom, allowing an administrator to extend, pan, and tilt the camera 2302. Further, the camera 2302 can have remote on/off and zoom capabilities, allowing an administrator to power the camera on or off, and zoom in/out. For example, an administrator can control the camera unit 2300 so that the camera is angled inwards towards the inside of a storage compartment 2010. The administrator can then take visual inventory of the items and contents of the storage compartment 2010. In another example, an administrator can control the camera unit 2300 so that the camera 2302 is angled downwards or outwards to view the surroundings or any users attempting to access the storage compartment 2010.

While aspects herein have generally been described in reference to management of office supplies or flammable materials, it is understood that systems and methods herein can be applied to other environments as well. For example, container systems herein can be used in food service, laboratory environments (including "clean rooms"), factories, and others.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., does not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using devices or systems and performing incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A flame retardant storage cabinet, comprising:
   a storage compartment having an interior that houses one or more shelves configured to hold one or more items, wherein the storage compartment has a door, and the storage compartment provides flame retardant protection to the one or more items;
   a control bay attached to the storage compartment, the control bay comprising:
   a front face that extends in front of the door of the storage compartment, defining a sidewall that extends from the door of the storage cabinet to the front face of the control bay;
   a verification component configured to receive a portion of data from a user to complete a verification of the user;
   a locking mechanism that interacts with the door to lock or unlock the door, based upon the verification of the user; and
   one or more cameras affixed to an exterior surface of the control bay, wherein the one or more cameras comprises a first camera located on the sidewall, wherein the first camera is positioned to view at least a first shelf inside the storage compartment;
   a scanning device that provides a scan of indicia corresponding to the one or more items to indicate a removal from the storage compartment; and
   a controller component that is configured to record media from the one or more cameras, the controller component monitors an amount or quantity of the one or more items based on at least one of the scan or recorded media from the one or more cameras, and stores at least one of the portion of data, the scan, or the recorded media.

2. The flame retardant storage cabinet of claim 1, wherein the interior of the storage compartment is isolated from any electronic components.

3. The flame retardant storage cabinet of claim 1, wherein the controller component is configured to identify an initial inventory amount of the one or more items and a present inventory amount of the one or more items, and verify a difference between the initial inventory amount and the present inventory amount by analyzing the recorded media from the one or more cameras.

4. The flame retardant storage cabinet of claim 1, wherein the one or more cameras further comprises a second camera located below the first camera on the sidewall, wherein the second camera is positioned to view at least a second shelf located below the first shelf inside the storage compartment.

5. The flame retardant storage cabinet of claim 4, wherein the one or more cameras further comprises a third camera located below the second camera on the sidewall, wherein the third camera is positioned to view at least a third shelf located below the second shelf inside the storage compartment.

6. The flame retardant storage cabinet of claim 1, wherein the door comprises a door magnet, and the locking mechanism magnetically engages the door magnet to lock or unlock the door, based upon the verification of the user.

7. The flame retardant storage cabinet of claim 1, wherein, the control bay further comprises a slot; and
   the door comprises a door latch configured to insert into the slot when the door is in a closed position, wherein the locking mechanism magnetically engages the door latch within the control bay to lock or unlock the door, based upon the verification of the user.

8. The flame retardant storage cabinet of claim 1, wherein, the control bay further comprises a slot;
   the locking mechanism comprises a locking bolt; and
   the door comprises a door latch configured to insert into the slot when the door is in a closed position, wherein the locking mechanism engages the locking bolt to insert into the door latch to lock the door, based upon the verification of the user.

9. The flame retardant storage cabinet of claim 1, further comprising a radio frequency identification (RFID) reader configured to scan one or more RFID tags associated with the one or more items as the one or more items are removed from the storage compartment.

10. The flame retardant storage cabinet of claim 9, wherein the controller component is configured to receive a scan of the one or more RFID tags from the RFID reader, and monitor the amount or quantity of the one or more items based on at least the scan.

11. The flame retardant storage cabinet of claim 9, wherein the RFID reader is located on the storage compartment.

12. The flame retardant storage cabinet of claim 9, wherein the RFID reader is located on the control bay.

13. The flame retardant storage cabinet of claim 1, wherein the one or more shelves are spill-proof shelves.

14. The flame retardant storage cabinet of claim 1, wherein the control bay further comprises a graphic strip having indicia, and the scanning device is configured to provide a scan of the indicia to indicate a command.

15. The flame retardant storage cabinet of claim 1, wherein the one or more shelves include one or more graphic strips having indicia, wherein the indicia correspond to the one or more items on the one or more shelves and the scanning device is configured to provide a scan of the indicia to indicate a removal or a replacement of the one or more items.

16. The flame retardant storage cabinet of claim 1, further comprising a camera unit mounted to an outside surface of the flame retardant storage cabinet, the camera unit includes a camera mounted to the end of an articulating arm, wherein movement of the camera unit is controlled remotely by an administrator, and the camera can be directed outwards to view an area surrounding the flame retardant storage cabinet, and inwards to view the one or more items within the storage compartment.

17. The flame retardant storage cabinet of claim 1, further comprising a camera bay with at least one bay camera mounted thereon, wherein the camera bay provides a route for wiring the at least one bay camera to the control bay in order to provide electrical isolation from the interior of the storage compartment.

18. A storage compartment comprising:
   a back wall;
   a floor;
   a ceiling;
   a first side wall;

a second side wall opposite the first side wall; and a door comprising a door latch, wherein the door latch is insertable into a slot on a control bay, wherein the door latch is configured to be mechanically engaged by an electronically actuated locking mechanism located within the control bay to lock the door in a closed position, and wherein the back wall, the floor, the ceiling, the first side wall, the second side wall, and the door define an interior that houses one or more shelves configured to hold one or more items, and the storage compartment provides flame retardant protection and electrical isolation to the interior.

* * * * *